(12) United States Patent
Yamaguchi et al.

(10) Patent No.: US 6,187,154 B1
(45) Date of Patent: Feb. 13, 2001

(54) ELECTROLYZED WATER PRODUCTION SYSTEM

(75) Inventors: Hiroki Yamaguchi; Fumiyuki Hori, both of Toyoake; Yoshinori Kamitani, Nagoya, all of (JP)

(73) Assignee: Hoshizaki Denki Kabushiki Kaisha, Aichi-Ken (JP)

(*) Notice: Under 35 U.S.C. 154(b), the term of this patent shall be extended for 0 days.

(21) Appl. No.: 09/177,890

(22) Filed: Oct. 23, 1998

(30) Foreign Application Priority Data

Oct. 23, 1997 (JP) .................................................. 9-291260
Nov. 13, 1997 (JP) .................................................. 9-312438

(51) Int. Cl.$^7$ ....................................................... C25B 9/00
(52) U.S. Cl. ..................................... 204/228.6; 204/230.6
(58) Field of Search ............................. 204/228.6, 228.1, 204/230.2, 230.6, 257, 263, DIG. 9; 205/335

(56) References Cited

U.S. PATENT DOCUMENTS 5,624,535 * 4/1997 Tsuchikawa et al. ................ 204/228
5,798,028 * 8/1998 Tsuchikawa et al. ................ 204/228
5,948,220 * 9/1999 Kamitani et al. ................... 204/228.2

FOREIGN PATENT DOCUMENTS 7-155764    6/1995  (JP) .

* cited by examiner

Primary Examiner—Kathryn Gorgos
Assistant Examiner—Thomas H Parsons
(74) Attorney, Agent, or Firm—Arent Fox Kintner Plotkin & Kahn, PLLC

(57) ABSTRACT

An electrolyzed water production system has a brine storage tank, brine supply means for supplying the saturated brine from the storage tank for mixing with raw water supplied from a source of raw water and an electrolytic cell for producing electrolyzed water. An electric control circuit comprises detection means for detecting the conductivity of the diluted brine supplied to the electrolytic cell, and feedback control means for controlling operation of the brine supply means in such a manner that the conductivity of the diluted brine detected by the detection means is adjusted to a predetermined target value. The circuit also includes memory means for memorizing an amount of saturated brine mixed with the raw water in operation of the brine supply means under control of the feedback control means, and initial control means for controlling operation of the brine supply means in such a manner that a supply amount of saturated brine is adjusted on a basis of the instant amount of saturated brine memorized in the memory means during previous operation of the brine supply means under control of the feedback control means when the electrolytic cell is activated to start production of the electrolyzed water.

13 Claims, 17 Drawing Sheets

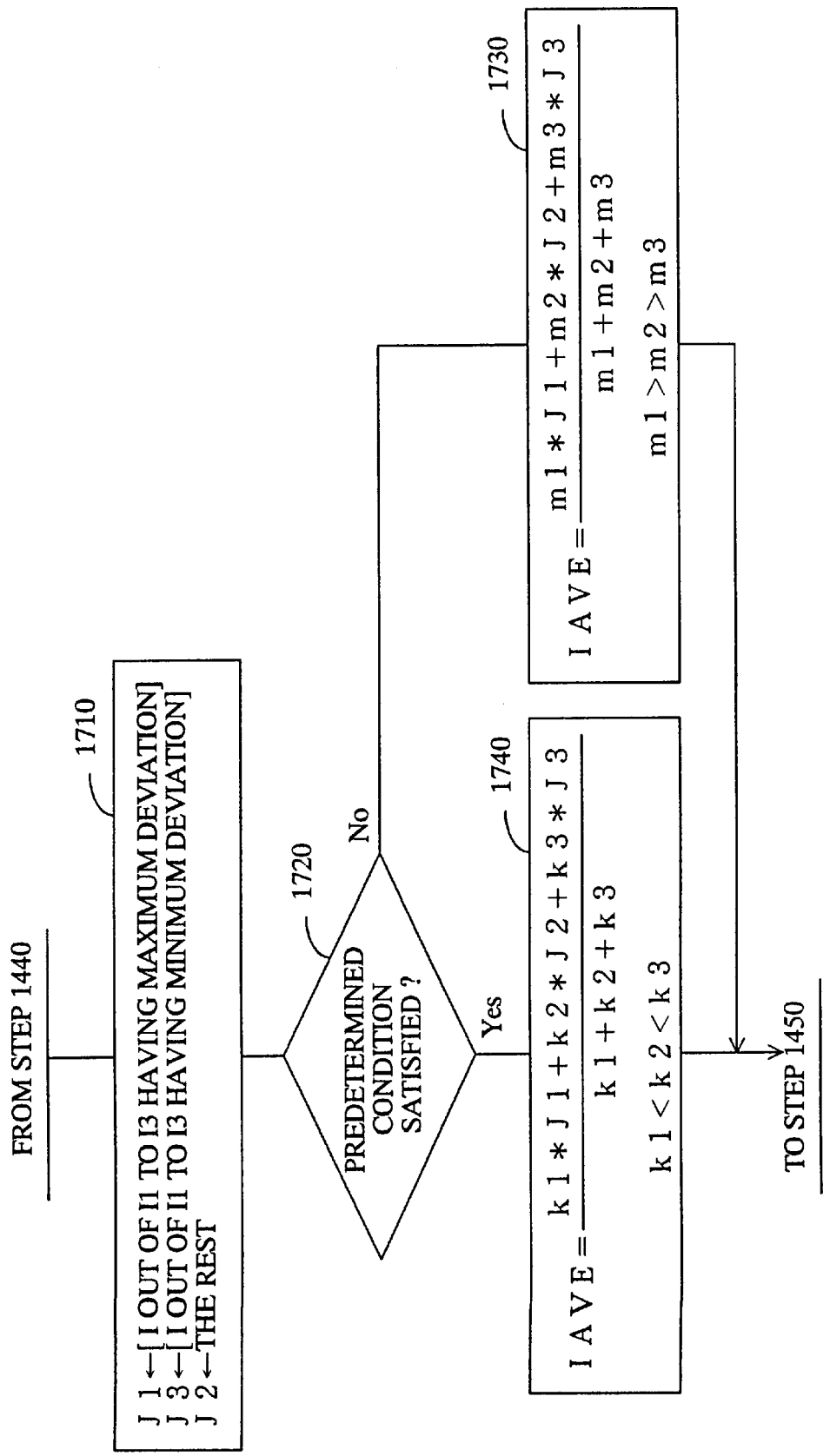

ELECTROLYZED WATER PRODUCTION SYSTEM

BACKGROUND OF THE INVENTION

1. Field of the Invention

The present invention relates to an electrolyzed water production system of the type which includes an electrolytic cell arranged to electrolyze diluted brine prepared by a mixture of raw water and saturated brine of predetermined concentration for producing electrolyzed water.

2. Description of the Prior Art

Disclosed in Japanese Patent Laid-open Publication 7-155764 is an electrolyzed water production system of this kind which includes an electrolytic cell arranged to be supplied with diluted brine prepared by a mixture of saturated brine of predetermined concentration and raw water supplied from an external source of raw water and to be activated by predetermined voltage applied at its electrodes. In the conventional production system, the property of the electrolyzed water is influenced by an amount of saturated brine mixed with the raw water. For this reason, the amount of saturated brine is adjusted by feedback control such that the electric current across the electrodes (or the conductivity of the diluted brine) becomes substantially equal to a predetermined target value.

However, since the amount of the saturated brine mixed with the raw water is always increased from a constant amount under the feedback control when the system is activated to produce the electrolyzed water, the time required to produce the electrolyzed water having a desired property in one system placed in the area where the raw water is hard water is largely different from the time required in another system placed in the area where the raw water is soft water.

In the conventional electrolyzed water production system, an electrically operated fluid pump the discharge amount of which can be easily controlled is used to supply the saturated brine for mixing with the raw water. The fluid pump is in the form of a fluid pump of the pulse driven type which includes a solenoid arranged to be applied with pulse train signals of a predetermined period so that the piston is reciprocated by attractive forces caused by energization of the solenoid. On the other hand, the feedback control is effected by an electrical control circuit of the digital type such as a microprocessor which is programmed to detect a value of electric current across the electrodes at a predetermined interval and to control the discharge amount of the fluid pump in such a manner that the value of electric current is adjusted to the target current value. In such feedback control of the fluid pump, however, the conductivity of the diluted brine is discontinuously detected by the digital circuit and fluctuates since the fluid pump is intermittently operated in response to each pulse applied thereto under control of the digital circuit. As a result, the feedback control is carried out in dependence upon a conductivity different from an average conductivity of the diluted brine, and the supply amount of the saturated brine becomes insufficient or excessive, resulting in irregular production of the electrolyzed water.

SUMMARY OF THE INVENTION

It is therefore, a primary object of the present invention to provide an electrolyzed water production system wherein the amount of saturated brine mixed with the raw water is adjusted in accordance with the property of the raw water so that the concentration of diluted brine supplied to the electrolytic cell is controlled in an optimal value within a predetermined period of time.

A secondary object of the present invention is to provide an electrolyzed water production system wherein the conductivity of diluted brine in the electrolytic cell is accurately detected to produce electrolyzed water homogeneous (stable) in quality under the feedback control.

According to the present invention, the primary object is accomplished by providing an electrolyzed water production system having a brine storage tank arranged to store an amount of saturated brine of a predetermined concentration, a brine supply means for supplying the saturated brine from the storage tank for mixing with raw water supplied from a source of raw water and an electrolytic cell arranged to be supplied with diluted brine prepared by a mixture of the raw water and saturated water for producing electrolyzed water, wherein an electric control apparatus for the electrolyzed water production system comprises a detection means for detecting the conductivity of the diluted brine supplied to the electrolytic cell, feedback control means for controlling the operation of the brine supply means in such a manner that the conductivity of the diluted brine detected by the detection means is adjusted to a predetermined target value, memory means for memorizing an amount of saturated brine mixed with the raw water during operation of the brine supply means under control of the feedback control means and initial control means for controlling the operation of the brine supply means in such a manner that a supply amount of saturated brine mixed with the raw water is adjusted on a basis of the instant amount of saturated brine memorized in the memory means during a previous operation of the brine supply means under control of the feedback control means when the electrolytic cell is activated to start production of the electrolyzed water.

In a practical embodiment of the present invention, it is preferable that the initial control means is designed to control the operation of the brine supply means in such a manner that the supply amount of the saturated brine mixed with the raw water is decreased in a predetermined amount less than that of saturated brine memorized in the memory means. Alternatively, it is preferable that the initial control supply means is designed to delay the operation of the brine supply means under control of the feedback control means until the conductivity of the diluted brine detected by the detection means becomes larger than a predetermined reference value.

In a modification of the present invention, the reference value may be defined by the target value of the feedback control means or defined to be decreased in accordance with a lapse of time after the electrolytic cell is activated to start production of the electrolyzed water. In addition, the initial control means may be designed to operate the brine supply means under control of the feedback control means after lapse of a predetermined time when the electrolytic cell is activated to start production of the electrolyzed water. Alternatively, the initial control means may be modified to operate the brine supply means under control of the feedback control means after a change rate of conductivity of the diluted brine detected by the detection means is decreased less than a predetermined reference value.

According to the present invention, the secondary object is accomplished by providing an electrolyzed water production system having a brine storage tank arranged to store an amount of saturated brine of a predetermined concentration, a fluid pump of the type driven by pulse train signals applied thereto from a pulse signal generator to supply a predetermined amount of saturated brine from the brine storage tank for mixing with raw water supplied from a source of raw water, and an electrolytic cell arranged to be supplied with the diluted brine prepared by a mixture of the saturated brine and raw water for producing electrolyzed water, wherein an electric control apparatus for the production system comprises a detection means for detecting the conductivity of diluted brine supplied to the electrolytic cell at a first predetermined time interval, calculation means for calculating an average value of the conductivity successively detected by the detection means, and pulse control means for adjusting a period of the pulse train signals applied to the fluid pump from the pulse signal generator in accordance with a difference between the calculated average value of the conductivity and a predetermined target value so that the average conductivity becomes substantially equal to the target value.

In the electrolyzed water production system described above, it is preferable that the pulse control means be designed to adjust the period of the pulse train signals at a second predetermined time interval more than the first predetermined time interval, and wherein the calculation means is designed to calculate the average value of the conductivity on a basis of plural data indicative of a conductivity detected by the detection means plural times at the first predetermined time interval during the second predetermined time interval except for several data indicative of a conductivity detected successively by the detection means immediately after adjustment of the period of the pulse train signals. It is also preferable that the calculation means be designed to weight the conductivity with a value which becomes larger as a difference between the conductivity detected by the detection means and the target value becomes larger for calculating a weighted integral of the conductivity. Alternatively, the calculation means may be designed to weight the conductivity with a value which becomes smaller as a difference between the conductivity detected by the detection means and the target value becomes larger for calculating a weighted integral of the conductivity. The calculation means may be designed to weight the conductivity with a value which becomes larger as a difference between the conductivity detected by the detection means and the target value becomes larger until a predetermined condition is satisfied after the electrolytic cell is activated to start production of electrolyzed water and to weight the conductivity with a value which becomes smaller as a difference between the conductivity detected by said detection means and the target value becomes larger after the predetermined condition is satisfied.

BRIEF DESCRIPTION OF THE DRAWINGS

Other objects, features and advantages of the present invention will more readily appreciated from the following detailed description of preferred embodiments thereof when taken together with the accompanying drawings, in which

FIG. 17 is a flow chart of a control program (routine) executed by an electric circuit shown in FIG. 12 with respect to the fifth embodiment.

DESCRIPTION OF THE PREFERRED EMBODIMENT

Figure 1:
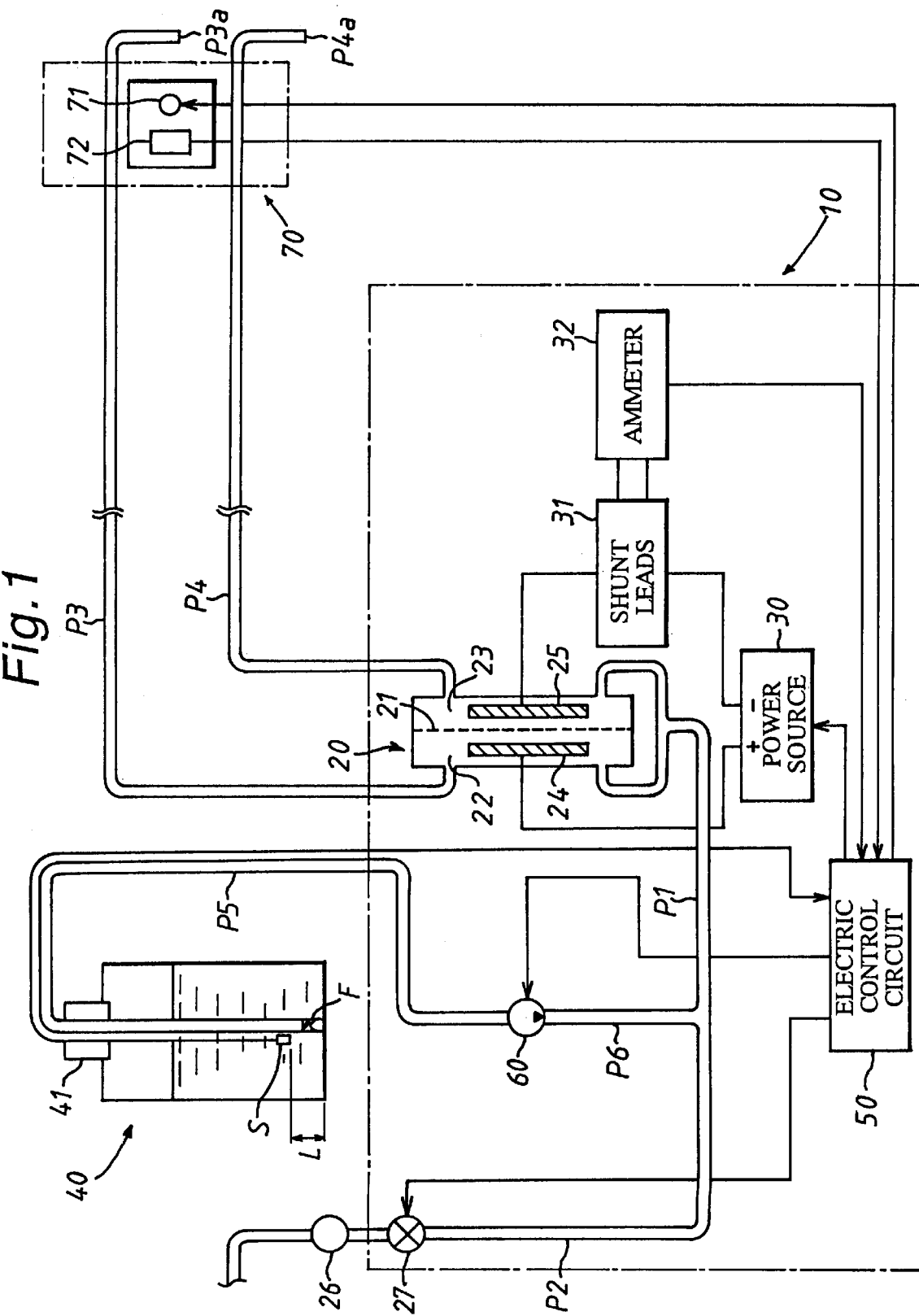
FIG. 1 is a schematic illustration of an electrolyzed water production system of the first embodiment in accordance with the present invention.

In FIG. 1 of the drawings, there is schematically illustrated a first preferred embodiment of an electrolyzed water production system in accordance with the present invention. The electrolyzed water production system includes a cabinet 10 containing an electrolytic cell 20, a power source 30, an electric control circuit 50 including a microprocessor (not shown) and a fluid pump 60, a storage tank 40 disposed on the cabinet 10, and a remote controller 70 operated by an operator.

The electrolytic cell 20 is subdivided into a pair of electrode chambers by a membrane 21 and contains a pair of electrodes 24, 25 in each chamber in such a manner that they are opposed to each other through the membrane 21. The electrolytic cell 20 is connected to a first supply conduit P1 at its lower portion and is connected to outlet conduits P3, P4 at its upper portion.

The power source 30 is in the form of a constant-voltage power supply source. The constant voltage generated by the power source 30 can be adjusted by a control signal applied from the electric control circuit 50 when a voltage adjuster (not shown) placed on the cabinet 10 is operated by the operator. An ammeter 32 is connected through shunt leads 31 to a power supply circuit between the power source 30 and the electrodes 24, 25 to measure an electric current flowing between the electrodes 24, 25 (i.e. current across the electrodes 24, 25). The ammeter 32 is also connected to the electric control circuit 50 to provide a signal indicative of the measured current I which represents a conductivity of diluted brine in the cell 20.

A second supply conduit P2 is connected at one end thereof to an external source of raw water and is connected at the other end thereof to the first supply conduit P1. The conduit P2 is equipped with a pressure reducing valve 26 and a solenoid-controlled water supply valve 27 to regulate the raw water flowing therethrough. The pressure reducing valve 26 acts to reduce the pressure of the raw water supplied into the conduit P2 from the external source of raw water to maintain the water pressure in a predetermined range. The water supply valve 27 is opened and closed under control of the electric control circuit 50 to supply the raw water into the electrolytic cell 20 from the external source of raw water through the first and the second supply conduits P1, P2.

The storage tank 40 is provided to store an amount of saturated brine of predetermined concentration. The tank 40 is equipped with a water level sensor (level switch) S and a brine outlet pipe (hose) P5 which are removable from the upper portion of the tank 40. The water level sensor S is connected to the electric control circuit 50 to provide a signal indicative of the water level L.

The fluid pump 60 is driven by an electric motor or other electric device (e.g. solenoid) to supply the saturated brine from storage tank 40 for mixing with the raw water flowing in the first supply conduit P1. An inlet opening of the pump 60 is connected to the brine outlet pipe P5 and an outlet opening of the pump 60 is connected to the brine supply pipe P6 which is connected to the portion between the first supply conduit P1 and a second supply conduit P2 at the downstream of the water supply valve 27. The operation of pump 60 is controlled by a signal applied from the electric control circuit 50 to adjust the discharge amount P of pump 60 while the system is a activated to produce the electrolyzed water in the cell 20.

The remote controller 70 is placed near the outlet openings P3a, P4a of discharge conduits P3, P4. The remote controller 70 is equipped with a brine make-up lamp 71 which indicates the shortage of brine in the storage tank 40 and with a start switch 72 operated by the operator. The brine make-up lamp 71 is turned on or off in response to a control signal applied from by the electric control circuit 50. The start switch 72 is provided to apply operation signals to the electric control circuit 50 for activating the components in the cabinet 10 to produce the electrolyzed water and for deactivating the components in the cabinet 10 to stop the production of electrolyzed water.

Figure 2:
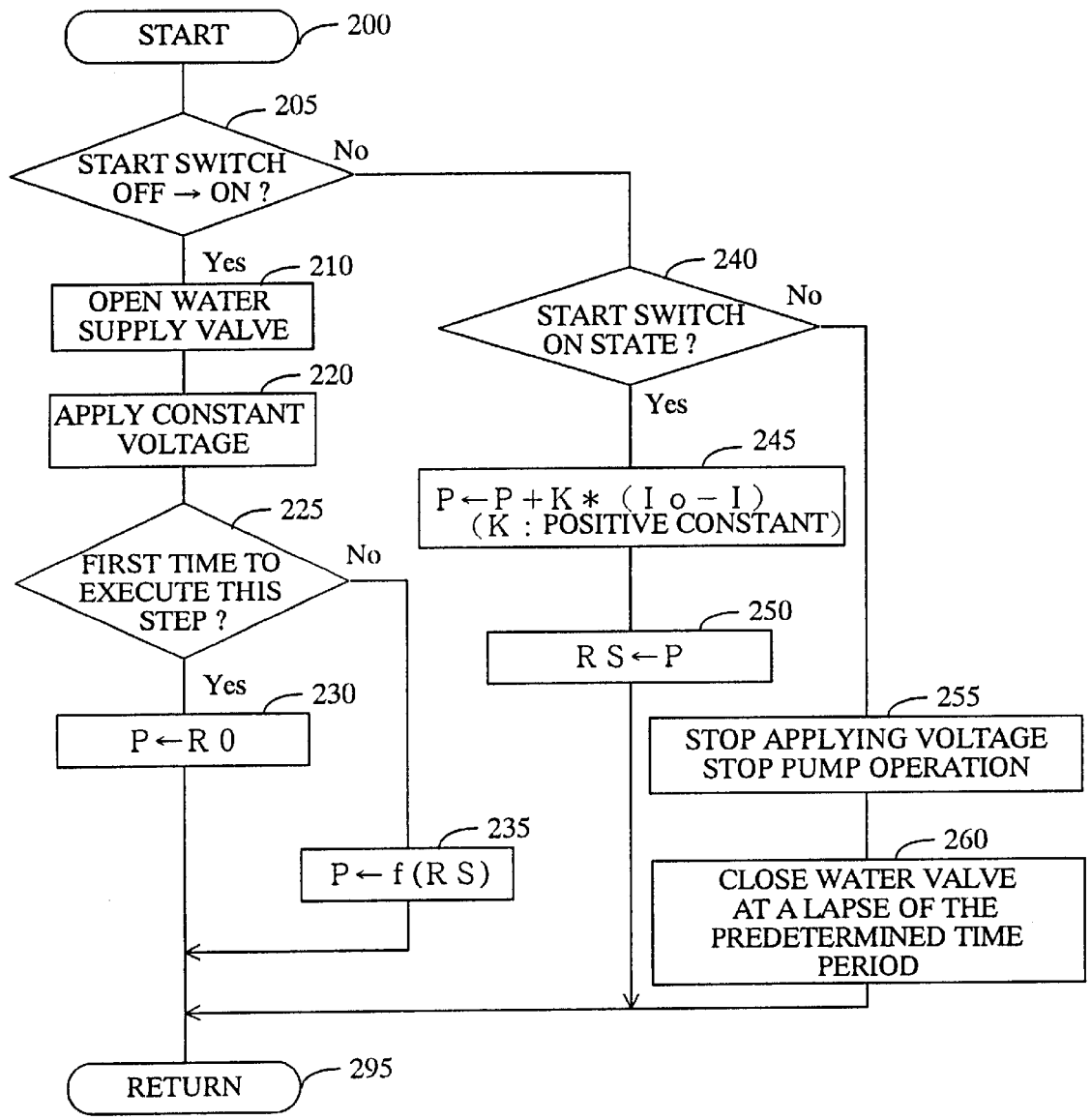
FIG. 2 is a flow chart of a control program (routine) executed by an electric circuit shown in FIG. 1 with respect to the first embodiment.
Figure 8:
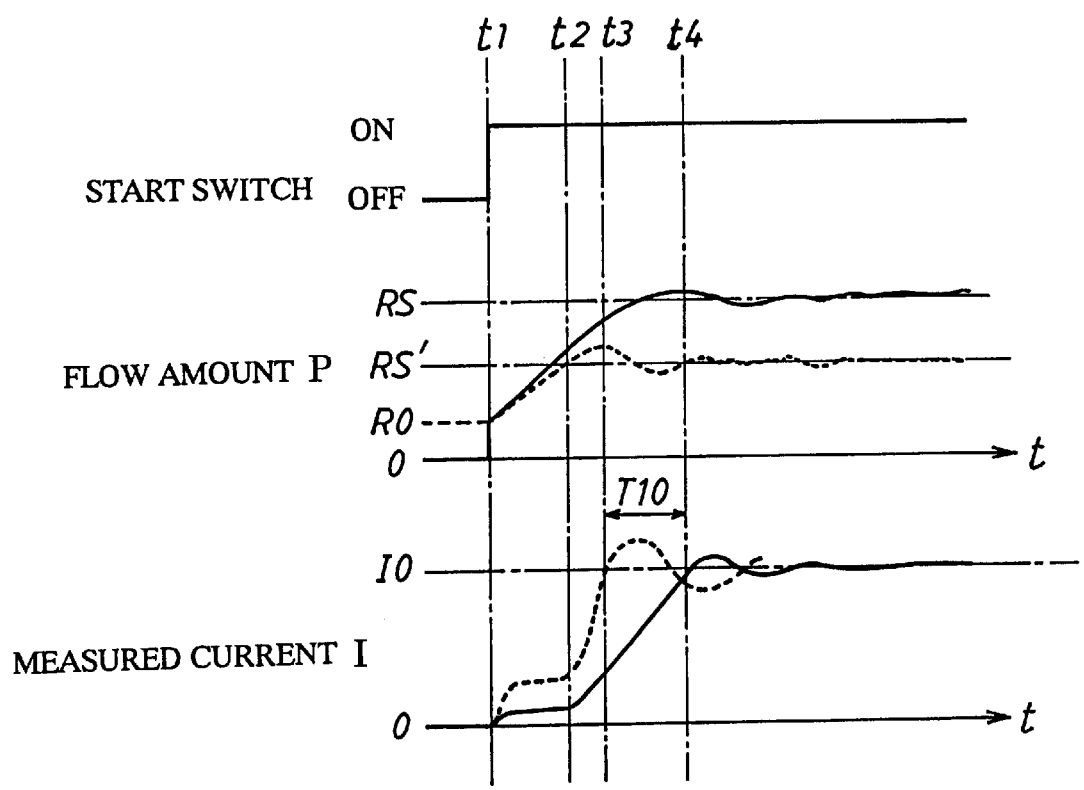
FIG. 8 is a time chart for explanation of operation of a conventional electrolyzed water production system.
Figure 9:
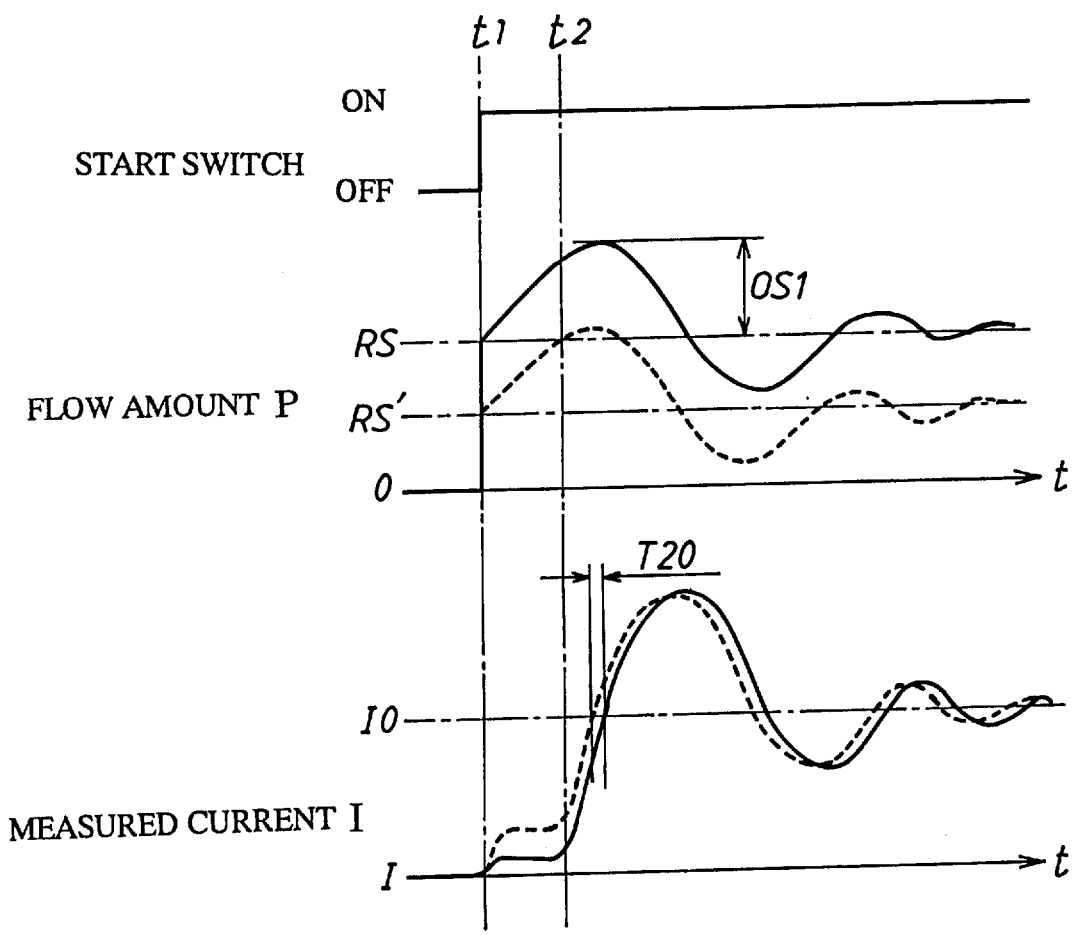
FIG. 9 is a time chart for explanation of operation of the electrolyzed water production system of the first embodiment.

Hereinafter, operation of the first embodiment of the electrolyzed water production system will be described with reference to FIGS. 2, 8 and 9 showing programs (routine) executed by the microprocessor of the electric circuit 50. Assuming that the power supply switch (not shown) of the electric control circuit 50 has been turned on by the operator, the microprocessor of the electric control circuit 50 starts to execute the program at step 200 shown in FIG. 2 at a predetermined time interval and determines at step 205 whether or not the state of the start switch 72 has been changed from the "off" state to the "on" state. When the operator turns on the start switch 72 to produce electrolyzed water, the electric control circuit 50 starts to activate the system for producing the electrolyzed water. In this instance, the electric control circuit 50 obtains a "Yes" answer at step 205 and causes the program to proceed to step 210 to open the water supply valve 27 for supplying the raw water into the electrolytic cell 20. When the program proceeds to step 220, the control circuit 50 causes the power source 30 to apply the constant voltage to the electrodes 24 and 25.

At the following step 225, the electric control circuit 50 determines an initial supply amount of the saturated brine to be mixed with the raw water appropriate for production of the electrolyzed water. Since at this stage, the start switch 72 is turned on for the first time after the power supply switch has been turned on, the electric control circuit 50 obtains a "Yes" answer at step 225 and causes the program to proceed to step 230 where the control circuit 50 sets a discharge amount P of the pump 60 to a predetermined constant value R0 as in a conventional system (See FIG. 8, timing t1). Thus, the program proceeds to step 295 wherein the control circuit 50 finishes the execution of the program routine.

The reason why the initial flow amount P of saturated brine to be discharged by the pump 60 is set to the predetermined constant value R0 is that any memorized value (learned value) RS, which will be described below, has not been obtained yet. In this instance, it is to be noted that the constant value R0 is determined to be a smaller value than a discharge amount of saturated brine necessary for production of electrolyzed water in under standard condition. Accordingly, the constant value R0 is determined on a basis of an assumption that the raw water of a standard property is used in the system and that the supply amount of the raw water is maintained in a standard amount.

When the electric control circuit 50 resumes at step 200 to execute the routine shown in FIG. 2 at the predetermined time interval, the circuit 50 obtains a "No" answer at step 205 since the state of the start switch 72 has not been changed during the interval, and causes the program to proceed to step 240 to determine whether the start switch is maintained in the "on" state or not. Thus, the circuit 50 obtains a "Yes" answer at step 240, and causes the program to proceed to step 245.

At step 245, the electric control circuit 50 carries out feedback control for the flow amount P to be discharged by the pump 60 to supply diluted brine of desired (optimal) conductivity. In this instance, the circuit 50 sets the flow amount P to be discharged by the pump 60 to a value defined by the addition of a value proportional to a difference between the measured current I and the predetermined target value I0 (i.e. K·(I0−I), K; positive constant) to the instant discharge amount P of pump 60. Since the electrolytic cell 20 is supplied with only raw water for cleaning after the system is deactivated to stop production of electrolyzed water as explained below, the electrolytic cell 20 is filled with the remaining raw water when the system is activated to resume production of electrolyzed water. Thus, the measured current I is always maintained in a smaller value than the target value I0 at the initial stage when the system is activated to start production of the electrolyzed water, and the flow amount P of saturated brine discharged by the pump 60 is increased as the value "K·(I0−I)" is positive.

Subsequently, the electric control circuit 50 proceeds to step 250 to set the memorized value RS to the instant flow amount P (i.e. the circuit 50 stores the instant flow amount P as the memorized value RS in the memory in the form of a RAM or an EEPROM), and finishes execution of the program routine at step 295. Thereafter, the electric control circuit 50 repeats execution of processing at step 200, 205, 240, 245, 250, and 295 at the predetermined time interval until the start switch 72, is turned off by the operator. Thus, the control circuit 50 carries out the feedback control for control of the flow amount P discharged by the pump 60 and renews the memorized value RS. During the operation of the system, the electrolyzed water with a stable and desired property is produced while the memorized value RS becomes substantially equal to a value corresponding to the quality of the raw water (e.g. the conductivity of raw water used in the system).

When the start switch 72 is turned off by the operator (i.e. the state of the start switch 72 is changed from the "on" state to the "off" state), the electric control circuit 50 executes processing necessary for stopping production of the electrolyzed water. In this instance, the electric control circuit 50 obtains a "No" answers at step 205 and 240, respectively and causes the program to proceed to step 255 where the control circuit 50 acts to stop applying voltage to the electrodes 24, 25 and to stop the operation of pump 60. At the following step 260, the electric control circuit 50 carries out processing necessary for turning the water supply valve 27 off after a lapse of predetermined time period during which the electrolytic cell 20 is cleaned and causes the program to proceed to step 295 where the control circuit 50 finishes the processing of the program routine. Thus, the system is conditioned to stop production of the electrolyzed water and clean the interior of the electrolytic cell 20 by the raw water.

In the case that the start switch 72 is turned on again by the operator after production of the electrolyzed water has been carried out at least once, the processing for setting the initial flow amount P discharged by pump 60 is executed by the control circuit 50 on a basis of the memorized value RS as follows.

In this instance, when the start switch 72 is turned on again, the electric control circuit 50 executes processing at steps 200, 205, 210, and 220 shown in FIG. 2 and causes the program to proceed to step 225. Since the processing at step 225 has been previously executed by the control circuit 50 after the power supply switch was turned on at this point of time, the circuit 50 obtains a "No" answer at step 225 and causes the program to proceed to step 235 where the control circuit 50 sets the initial flow amount P discharged by the pump 60 to the memorized value RS (f(RS)).

After the memorized value RS has been set as the initial flow amount P discharged by the pump 60, the electric control circuit 50 causes the program routine to proceed to step 245 through steps 200, 205 and 240. At step 245, the control circuit 50 after the lapse of the predetermined time interval, sets the flow amount P to be discharged by the pump 60 to a value "P+K·(I0−I)=RS+K·(I0−I)" to carry out the feedback control for control of the flow amount P of saturated brine discharged by the pump 60. Subsequently, the electric control circuit 50 causes the program routine to proceed to step 250 for setting the flow amount P just defined at step 245 as the memorized value RS and finishes at step 295 the execution of the program routine. Thereafter, the circuit 50 repeats processing steps 200, 205, 240, 245 and 250 to carry out the feedback control for control of the amount of saturated brine to be mixed with the raw water and to renew the memorized value RS until the start switch 72 is turned off. When the start switch 72 is turned off, the control circuit 50 obtains a "No" answer at step 240 and causes the program routine to proceed to step 255 and 260 for stopping production of the electrolyzed water.

In the first embodiment described above, it is to be noted that the initial flow amount P to be discharged by the pump 60 is set to the memorized value RS which becomes a value representing the quality of raw water used in the system (and/or the pressure of raw water as well as the concentration of saturated brine in the storage tank 40) under the feedback control. With such control of the flow amount P of saturated brine discharged from the pump 60, it can be avoided for the two electrolyzed water production systems used in the different area where the quality of raw water is different, such as hard water or soft water, to take different time periods from the timing that the start switch 72 is turned on up to the timing that the measured current I (i.e. the conductivity of diluted brine or the concentration of diluted brine). reaches the target value I0 (the target conductivity of diluted brine or the target concentration of diluted brine). That is, the excess or shortage of the flow amount of saturated brine discharged by the pump 60 in comparison with the optimal flow amount at the time when the saturated brine from the storage tank 40 reaches the interior of electrolytic cell 20 becomes substantially the same as the excess or the shortage of the flow amount of saturated brine discharged by the pump 60 in another system placed in the different area. Thus, the change rate of the measured current I from the timing that the saturated brine from the storage tank 40 reaches the electrolytic cell 20 for the first time after start of the production of electrolyzed water becomes substantially the same in the two systems and the concentration of diluted brine supplied to the cell 20 can be adjusted to an appropriate (optimal) value within the predetermined time period in both systems.

FIGS. 8 and 9 shows the difference in operation between the conventional system and the system of the first embodiment. FIG. 8 shows a flow amount P discharged by the pump 60 and the measured current I, in the course of time lapse, in the conventional systems in which the initial flow amount P is always set to the constant value R0. FIG. 8 shows two cases where the quality of the raw water is different from each other (i.e. the flow amount becomes different values RS and RS'), each case being shown by a solid line and a dotted line. FIG. 9 shows the flow amount P discharged by the pump 60 and the measured current I, in the course of time lapse, in the system of the first embodiment of the present invention in which the initial flow amount P is set to the memorized value RS. FIG. 9 also shows two cases where the quality of raw water is different from each other, each case being shown by a solid line and a dotted line. It will be understood that the difference in time between the timings that the optimal electrolyzed water (optimal the optimal concentration of dilute brine) is obtained in one system and obtained in another system is very large in the conventional system (see T10 in FIG. 8), whereas the difference in time between the timings is very small in the first embodiment (see T20 in FIG. 9).

Figure 10:
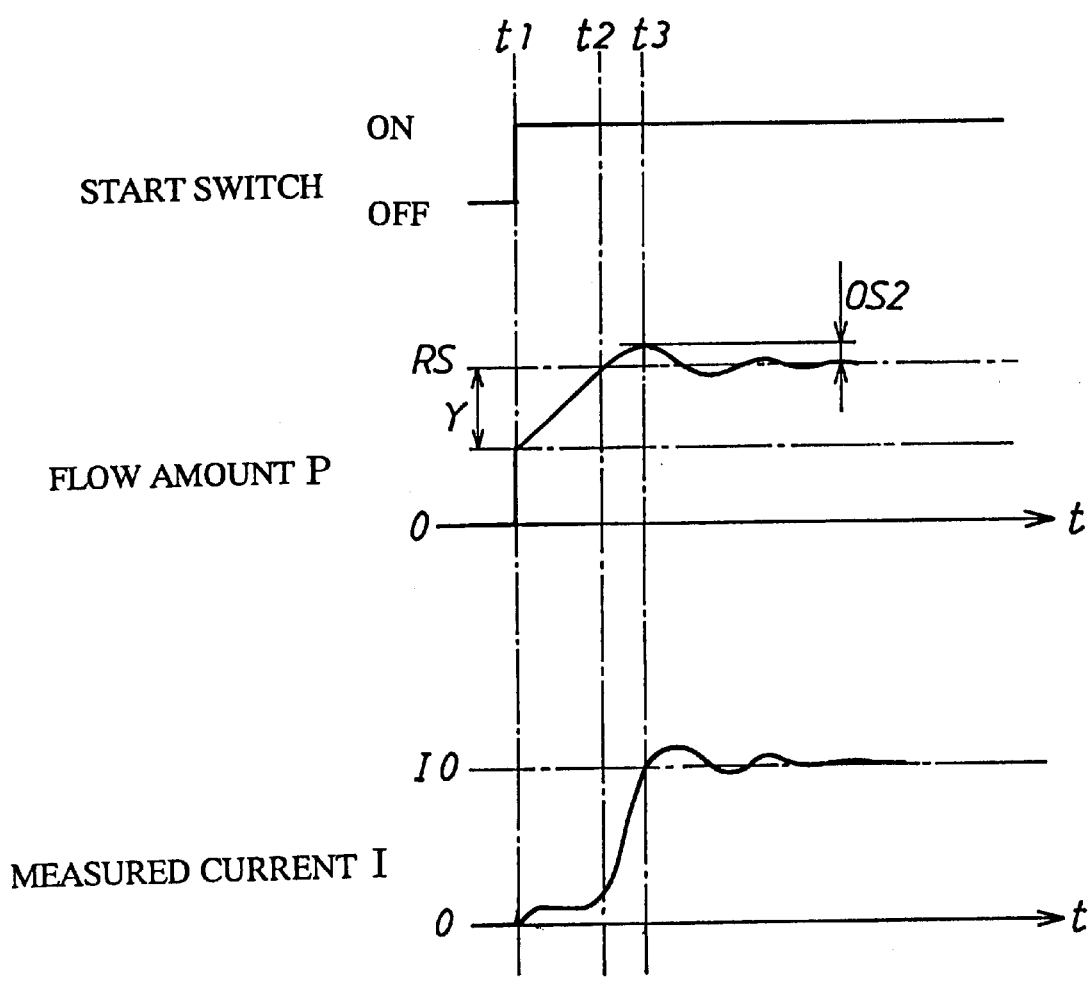
FIG. 10 is a time chart for explanation of operation of the electrolyzed water production system of the modified embodiment of the first embodiment.

Hereinafter, a modification of the first embodiment will be described. In this modification, the function f(RS) at step 235 in FIG. 2 is substituted for the function f(RS)=RS−Y, where Y is a positive value. That is, the initial flow amount P to be discharged by the pump 60 at start of the feedback control for the flow amount P is set to a smaller value than the memorized value RS. Except this point, the modification is the same as the first embodiment (see FIG. 10).

During the time period from the start timing to produce the electrolyzed water when the start switch 72 is turned on up to the timing that the saturated brine supplied by the pump 60 from the storage tank 40 reaches the electrolytic cell 20, the measured current I represents the conductivity of the raw water as described above and is smaller than the target value I0. In other words, the measured current I does not correspond with the flow amount P during this time period (see FIGS. 8–10, timing t1–t2). Accordingly, during this period, the flow amount P of saturated brine discharged by the pump 60 is increased regardless of whether or not the flow amount P is appropriate.

On the other hand, except for the very rare case where the quality of raw water rapidly changes, for instance as when the electrolyzed water production system is moved to a remote place, the flow amount P is usually saturated into the previously memorized value RS. Therefore, if the initial flow amount of saturated brine to be discharged by the pump 60 is set as the memorized value RS, the flow amount P of saturated brine becomes excessive during the time period mentioned above (see FIG. 9, OS1). This causes the generation of chlorine gas and a gas smell problem or erosion of metal used in the system.

To solve this problem, in the modification described above, the initial flow amount P of saturated brine determined to be a value defined by a difference between the positive value Y and the memorized value RS, and the value Y is determined to correspond with a time period during which the saturated brine discharged by the pump 60 reaches the electrolytic cell 20 (i.e. a time delay of the feedback control). By this means, the concentration of diluted brine can be adjusted to an optimal value within the predetermined time period, to avoid generation of the chlorine gas (see FIG. 9, 10, OS 2<OS 1).

Figure 11:
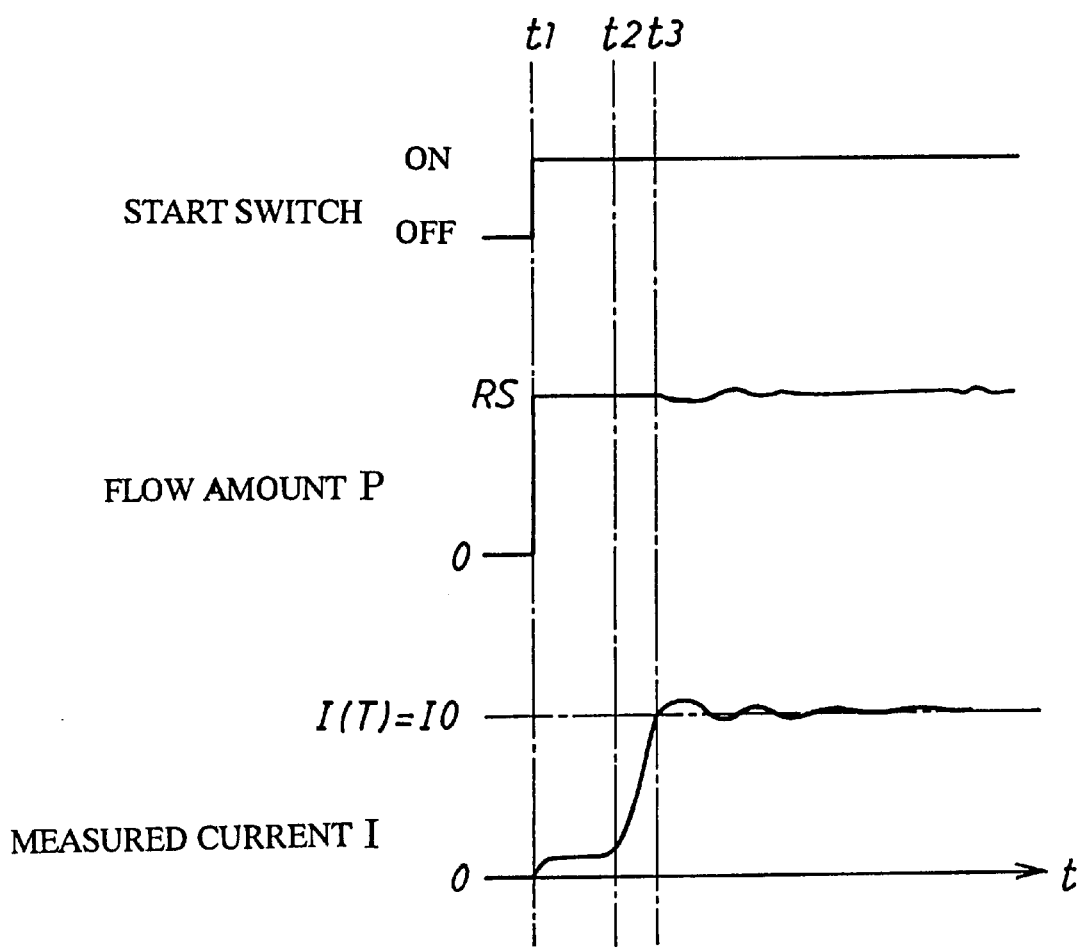
FIG. 11 is a time chart for explanation of operation of the electrolyzed water production system of the second embodiment.
Figure 12:
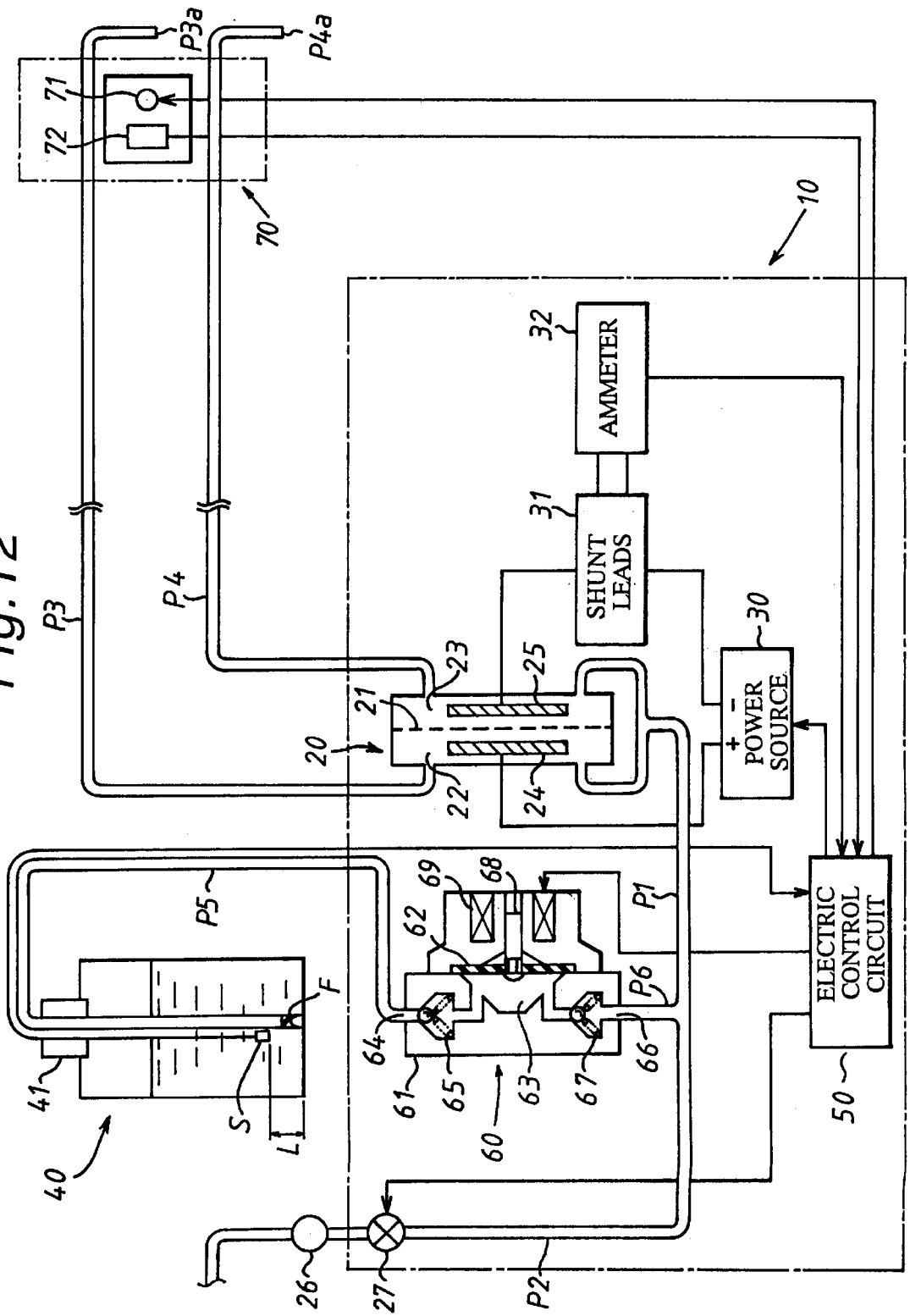
FIG. 12 is a schematic illustration of an electrolyzed water production system of the third, the fourth and the fifth embodiment in accordance with the present invention.

Hereinafter, a second embodiment of the present invention will be described. The second embodiment is the same as the first embodiment except for a program routine of FIG. 3 substituted for the routine shown in FIG. 2. In operation, the control circuit 50 in the first embodiment starts to execute processing for the feedback control of the flow amount P of saturated brine discharged by the pump 60 immediately after the initial value of the flow amount P of saturated brine is set to the memorized amount RS for production of electrolyzed water, whereas the control circuit 50 in the second embodiment delays processing for the feedback control of the flow amount P of saturated brine discharged by the pump 60 to maintain the flow amount P until the measured current I becomes larger than a predetermined reference value (for instance, the target value I0). Illustrated in a time chart of FIG. 11 are the flow amount P and the measured current I in the course of time after the start switch 72 is turned on in the second embodiment.

Figure 3:
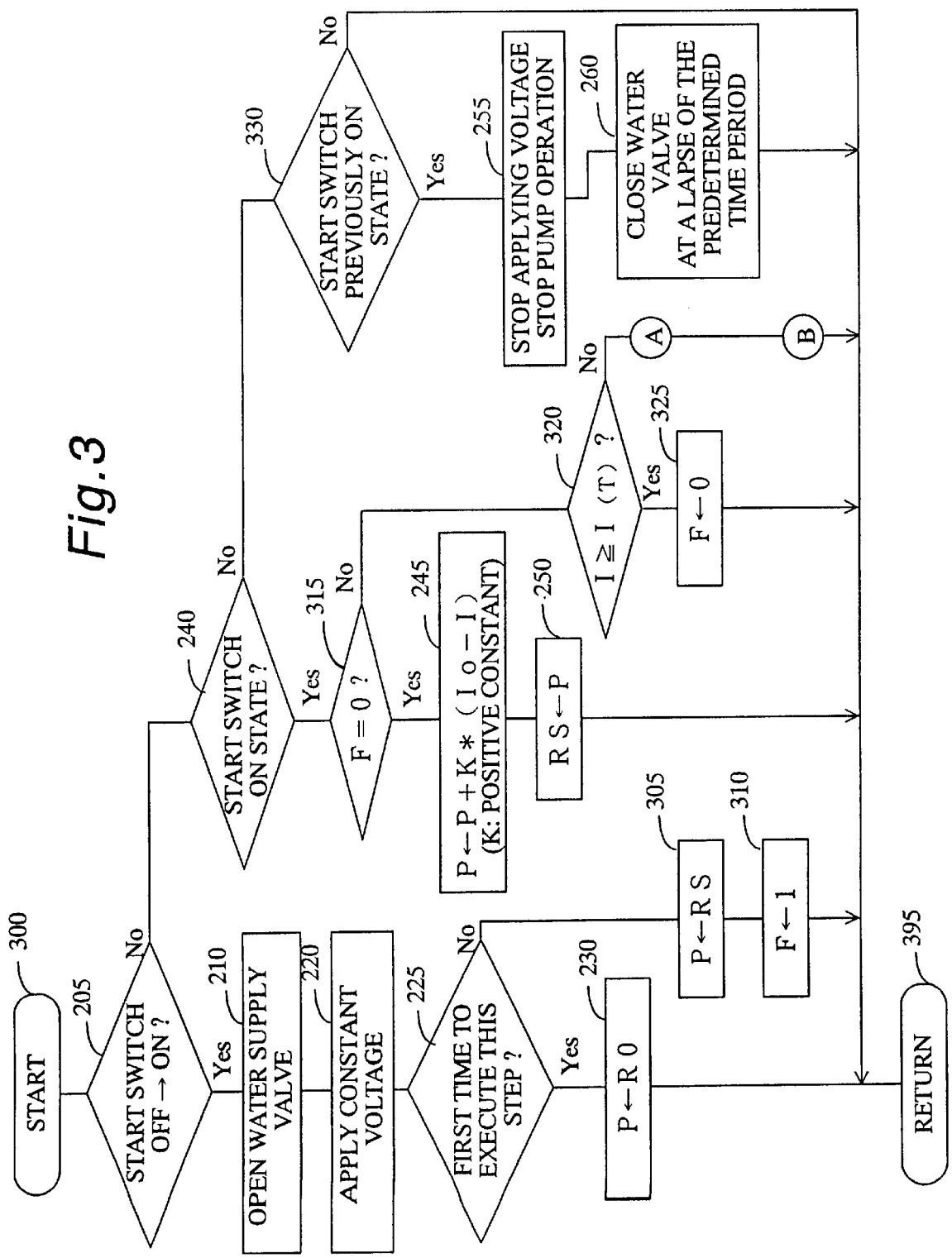
FIG. 3 is a flow chart of a control program (routine) executed by an electric circuit shown in FIG. 1 with respect to the second embodiment.

When the start switch 72 is turned on for the first time after the power supply switch has been turned on, the control circuit 50 executes processing at step 300, 205, 210, 220, 225 and 230 shown in FIG. 3 to start production of electrolyzed water as in the system of the first embodiment and sets the initial flow amount P to be discharged by the pump 60 to the constant value R0 at step 230.

When the electric control circuit 50 executes this routine from step 300 again, it proceeds to step 315 through steps 205 and 240 to determine whether flag "F" is "0". The flag "F" is used to prohibit the feedback control for the flow amount P discharged by the pump 60 and is set at "0" by an initial routine not shown. Thus, the electric control circuit 50 obtains a "Yes" answer at step 315 and proceeds to step 245 to start the feedback control immediately in which the flow amount P to be discharged by the pump 60 is set as "P+K·(I0−I)". Subsequently, the electric control circuit 50 stores the instant flow amount P as the memorized value RS at step 250 and finishes this routine tentatively at step 395.

Thereafter, the electric control circuit 50 repeats processing at the above steps to produce electrolyzed water and to renew the memorized value RS.

When the start switch 72 is turned off, the electric control circuit 50 stops the operation for producing electrolyzed water. In this instance, the circuit 50 obtains a "No" answer respectively at step 205 and 240, and causes the program to proceed to step 330 to determine whether the state of the start switch 72 was "on" when it executed this routine previously. In this case, the circuit 50 obtains a "Yes" answer at step 330 and carries out the processing necessary for stopping the production of electrolyzed water such as stopping applying voltage to the electrodes 24, 25, stopping the operation of the pump 60, and closing the water supply valve 27 upon a lapse of a predetermined time period at steps 255, 260. The operation described so far is substantially the same as the operation of the system in the first embodiment.

When the operator changes the state of the start switch 72 from the "off" state to the "on" state (i.e. the operator turns on the start switch 72) again, the electric control circuit 50 executes the processing at steps 300, 205, 210 and 220 to open the water supply valve 27 and to supply the voltage from the power source 30. The program routine then proceeds to step 225, as in the system of the first embodiment. In this instance, the electric control circuit 50 obtains a "No" answer at step 225, because the start switch 72 has already changed its state from the "off" state to the "on" state after the power supply switch was turned on by this point of time. Thus, the program routine proceeds to step 305 where the control circuit 50 sets the initial flow amount P discharged by the pump 60 to the memorized value RS. The electric control circuit 50, then, sets a flag "F" to "1" at step 310 to prohibit the feedback control of the flow amount discharged by the pump 60 and finishes the processing of the program routine at step 395.

After the flag "F" was changed from "0" to "1", the electric control circuit 50 causes the program routine to proceed to steps 300, 205, 240 and 315 to maintain the initial flow amount P discharged by pump 60 instead of the feedback control of the flow amount P. In this instance, the electric control circuit 50 obtains a "No" answer at step 315 and causes the program routine to proceed to step 320.

At step 320, the electric control circuit 50 determines whether the measured current I is equal to or larger than the reference value I(T) defined to be equal to the target value I0. Since the electrolytic cell 20 is filled with raw water immediately after the system starts to produce the electrolyzed water, the measured current I is relatively small. Thus, the control circuit 50 obtains a "No" answer at step 320 and finishes the program routine at step 395. Thereafter, the electric control circuit 50 repeats the execution of processing at the steps until a "Yes" answer is obtained at step 320. As a result, the flow amount P discharged by the pump 60 is maintained in the initial flow amount which is equal to the stored amount (memorized value) RS.

By the operation described above, production of the electrolyzed water is started, and the saturated brine from the storage tank 40 reaches the electrolytic cell 20. Upon a lapse of predetermined time period after start of the production of electrolyzed water, the measured current I increases larger than the target value I(T) (reference value I0), because cell 20 is filled with the diluted brine which contains an amount of the saturated brine defined by the memorized value RS. Thus, the electric control circuit 50 obtains a "Yes" answer at step 320 and causes the program routine to proceed to step 325 to change the flag "F" from "1" to "0". When the program routine is subsequently executed, the control circuit 50 obtains a "Yes" answer at step 315 following the steps 300, 205 and 240, and causes the program routine to proceed to step 245 to start the feedback control. When the program routine proceeds to step 250 the control circuit 50 renews the memorized value RS by setting the memorized value RS to the instant flow amount P obtained at the previous step 245. This feedback control and the renewal of the memorized value RS are continued until the operation for stopping production the electrolyzed water is carried out at both steps of 255 and 260 that follow steps 300, 205, 240, and 330 when the start switch 72 is turned off.

In the second embodiment described above, during the time period between the start of the production of the electrolyzed water and the timing that the measured current I becomes larger than the target value 10 (see FIG. 11, t1–t3), the flow discharged amount P by the pump 60 remains at the memorized value RS which was renewed under the previous feedback control. This is effective to avoid the generation of chlorine gas.

In the second embodiment, the flow amount P discharged by the pump 60 is maintained, the control for substantially maintaining the flow amount P can be effected in a condition where the flow amount P is adjusted by a predetermined amount per second which is very small when compared with the amount per second by which the flow amount P is adjusted under the feedback control. Accordingly, the flow amount P can be substantially maintained by the feedback control with using the gain value "K" which is extremely small when compared with the value "K" used in the normal feedback control described above. Also, to ensure to start of the feedback control the reference value I(T) can be defined in a smaller value than the target value I0 by a predetermined amount.

Figure 4:
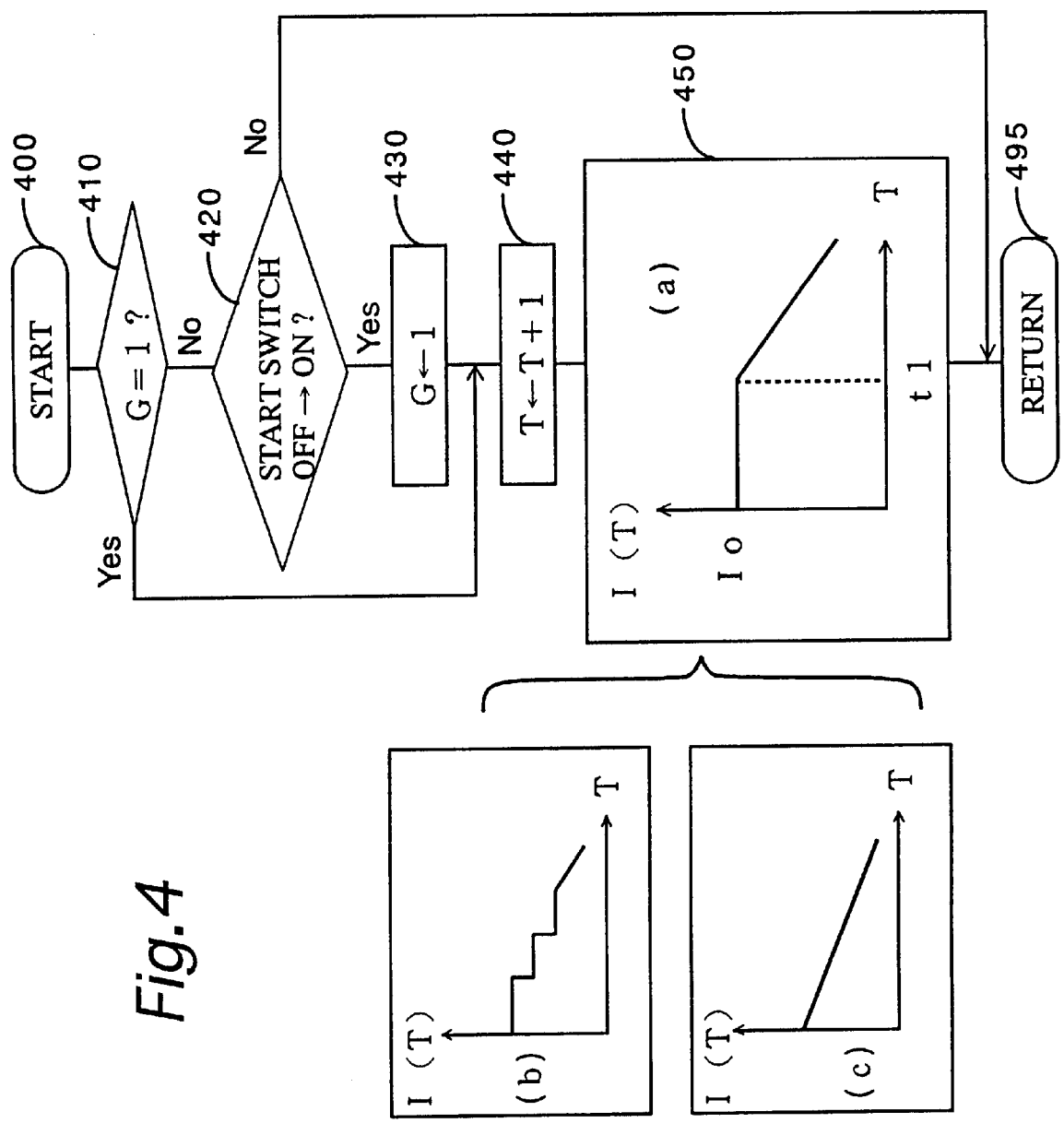
FIG. 4 is a flow chart of a control program (routine) executed by an electric circuit shown in FIG. 1 with respect to the first modified embodiment of the second embodiment.
Figure 5:
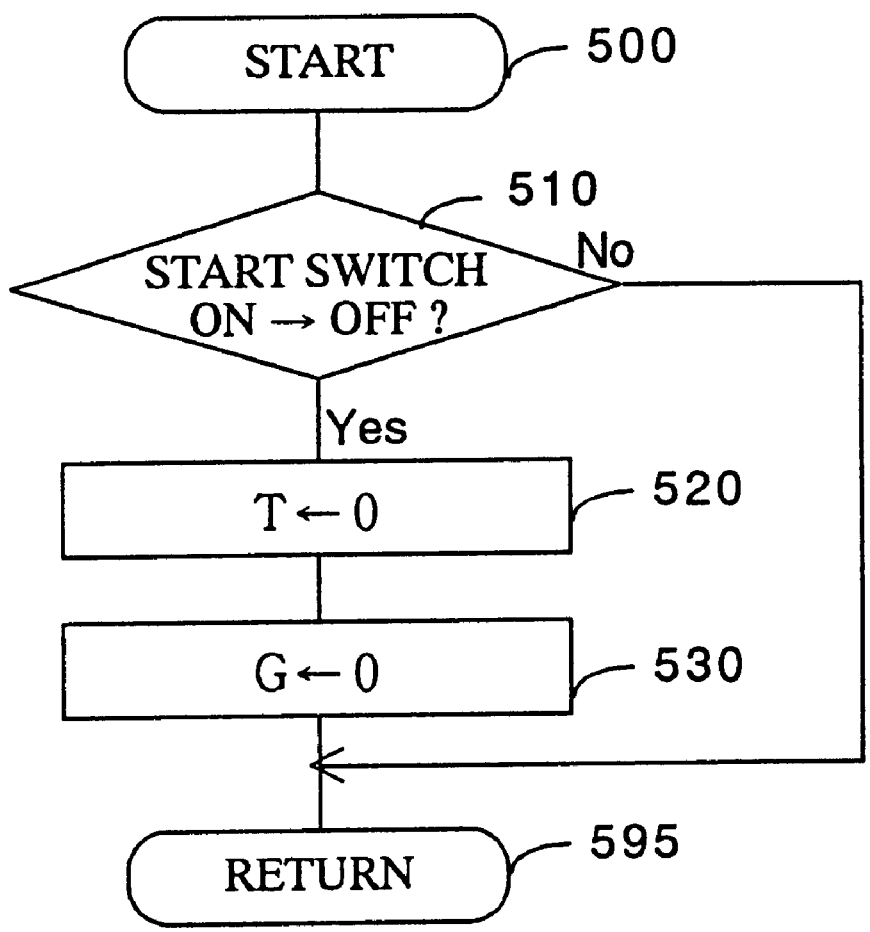
FIG. 5 is a flow chart of a control program (routine) executed by an electric circuit shown in FIG. 1 with respect to the first and the second modified embodiment of the second embodiment.

Hereinafter, a first modification of the second embodiment will be described. In this first modification, routines shown in FIGS. 4 and 5 are added to the routine shown in FIG. 3. The added routines are executed at a predetermined time interval by the electric control circuit 50 to decrease the reference value I(T) used at step 320 in upon a lapse of time after the system starts to produce electrolyzed water.

When the start switch 72 is turned on, the electric control circuit 50 starts at step 400 the routine shown in FIG. 4 and causes the program routine to proceed to step 410 to determine whether a flag "G" is "1". In this instance, the control circuit 50 obtains a "No" answer at step 410 since the flag "G" is set to "0" at step 530 in FIG. 5 as described later. When the program routine proceeds to step 420, the control circuit 50 determines whether the state of the start switch 72 is changed from the "off" state to the "on" state. At the time immediately after the start switch 72 was turned on, the electric control circuit 50 obtains a "Yes" answer at step 420 and causes the program routine to proceed to step 430 to set the flag "G" at "1". At the next step 440, the control circuit 50 increases a timer value T set to "0" at step 520 by "1". When the program routine proceeds to step 450, the control circuit 50 refers to a memorized table (a) to determine I(T) in accordance with the timer value T and finishes this routine at step 495 tentatively.

After the flag "G" was changed to "1" at step 430, the control circuit 50 causes the program routine to proceed to step 440 from step 410 to increase the timer value T. At the following step 450, the control circuit 50 determines the reference value I(T) in accordance with the timer value T on a basis of the memorized table (a). In this instance, by the operation described, the timer T indicates the time period after the system starts the production of the electrolyzed water, and the reference value I(T) is determined at step 450 in accordance with the timer value T. In actual practices of the modification, the table (a) may be substituted for a table (b) which is designed to decrease the reference value I(T) at plural steps in accordance with the timer value T or a table (c) which is designed to continuously decrease the reference value I(T) in accordance with the timer value T.

FIG. 5 shows a routine to reset the flag "G" and timer value T respectively. When the electric control circuit 50 starts at step 500 to execute the program routine at a predetermined time interval, the program routine proceeds to step 510 where the control circuit 50 determines whether the start switch 72 has been changed from the "on" state to the "off" state. If the answer at step 510 is Yes the routine proceeds to steps 520 and 530 where the control circuit 50 resets both timer value T and flag G to "0", respectively. At the following step 595, the program returns to the main routine of FIG. 3.

Since in the first modification of the second embodiment, the reference value I(T) decreases in accordance with a lapse of time after start of the system, the control circuit 50 does not determine a "No" answer at step 320 of FIG. 3 even if the measured current I does not increase due to changes in pressure of the external source of raw water or in the concentration of saturated brine in tank 40. This is effective to avoid the fact that the electrolyzed water of desired property may not be produced due to lack of the feedback control.

Figure 6:
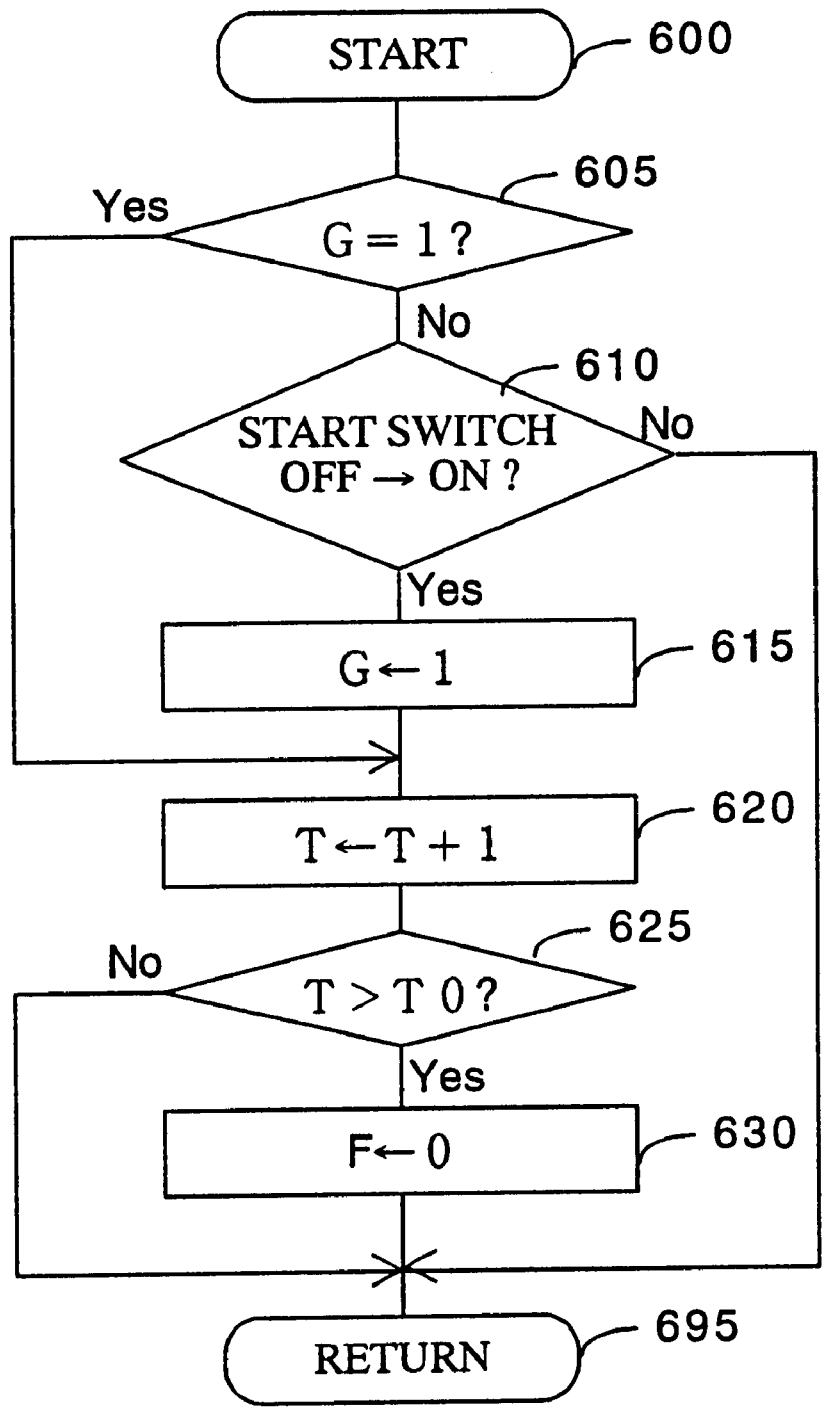
FIG. 6 is a flow chart of a control program (routine) executed by an electric circuit shown in FIG. 1 with respect to the second modified embodiment of the second embodiment.

Hereinafter, a second modification of the second embodiment will be described with reference to FIGS. 3, 5 and 6. In the second modification the program routines shown in FIGS. 3 and 5 are used as in the first modification, and; a routine shown in FIG. 6 is substituted for the program routine of FIG. 4 used in the first modification. The routine shown in FIG. 6 is executed by the electric control circuit 50 at a predetermined time interval to effect the feedback control of the flow amount P discharged by the pump 60 upon a lapse predetermined time period after start of the system for production of electrolyzed water.

At step 600 shown in FIG. 6, the electric control circuit 50 starts to execute the routine and determines at step 605 whether the flag "G" is "1". When the start switch 72 is retained in the "off" state, a "Yes" answer is determined at step 511 in FIG. 5, and the flag "G" is set to "0" at step 530 Thus, the control circuits 50 obtains a "No" answer at step 605 and causes the routine to proceed to step 610 to determine whether the start switch 72 is turned on. If the operator has not turned on the start switch 72, the control 50 obtains a "No" answer at step 610 and finishes execution of the routine at step 695.

When the operator turns on the start switch 72 at this state, the electric control circuit 50 obtains a "Yes" answer at step 610 and causes the routine to proceed to step 615 to set the flag "G" to "1". At the following to step 620 the control circuit 50 increases the timer value T by "1". Subsequently, the control circuit 50 determines at step 625 whether the timer value T increases larger than a predetermined value T0. Since the timer value T has been just started at this point of time, the electric control circuit 50 obtains a "No" answer at step 625 and finishes at step 695.

When the control circuit 50 executes the program routine after the flag "G" was previously set to "1" at step 615, the control circuit 50 causes the program routine to proceed to step 620 from step 605 directly to increase the timer value T. In this instance, the timer value T indicates a lapse of time after start of the system for production of electrolyzed water. Thus, the control circuit 50 obtains a "Yes" answer at step 625 after lapse of the predetermined time period and causes the program routine to proceed to step 630 to set the flag F for prohibition of the feedback control to "0". As a result, during execution of the routine shown in FIG. 3, the control circuit 50 obtains a "Yes" answer at step 315 which follows steps 300, 205 and 240 and causes the program routine to proceed to step 245 to execute the processing for the feedback control.

In the second modification described above, the feedback control of the flow amount P is effected when the flag F is set to "0" upon lapse of the predetermined time period T0. Accordingly, even if the measured current I does not increase enough to start the feedback control, the feedback control of the flow amount P is forcibly effected upon lapse of the predetermined time period T. This is effective to avoid a situation where electrolyzed water of desired property may not be produced after start of the system. In this respect, it is to be noted that the timing that the measured current I becomes larger than the reference value I0 usually occurs before the timing that the timer value T becomes larger than the time period T0. In other words, the time period T0 is defined to be larger than the period during which the measured current I becomes larger than the reference value I0 in most cases. That is, it is inferred that the measured current I will not exceed the reference value I0 if it is less than the reference value I0 upon lapse of the time period T0. For this reason, the flag "F" is set to "0" when the time period T0 has passed.

Figure 7:
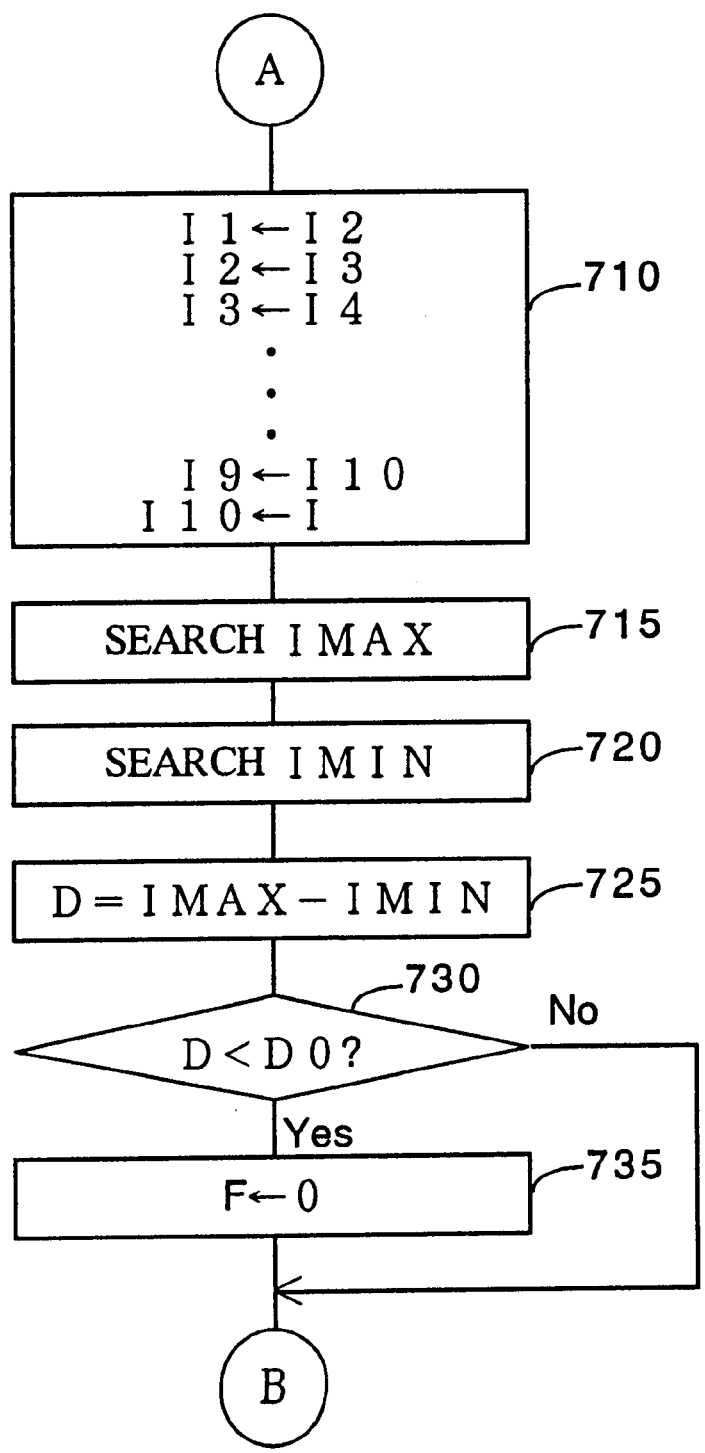
FIG. 7 is a flow chart of a control program (routine) executed by an electric circuit shown in FIG. 1 with respect to the third modified embodiment of the second embodiment.

Hereinafter, a third modification of the second embodiment will be described with reference to FIGS. 3 and 7. In this third modification, the routine shown in FIG. 7 is an additional routine inserted between step 320 and step 395 shown in FIG. 3. (see the characters A and B indicated with a circle). The addition routine is designed to effect the feedback control of the flow amount P when a maximum change rate of the measured current I within a predetermined time period is smaller that a predetermined reference value.

Assuming that the measured current I does not exceed the reference value I(T), the control circuit 50 obtains a "No" answer at step 320 in FIG. 3 and causes the program to proceed to step 710 to store 10 data of previously measured current I. In processing at step 710, the value stored in the RAM I(n+1) is transferred to the value in the RAM I(n) where "n" is a positive integer number from one(1) to nine(9), for instance, the content in the I1 is replaced by the content in the I2, and the instant measured current I is stored in the RAM I10. In this instance, the control circuit 50 searches the maximum value IMAX among values of I1 to I10 at step 715 and the minimum value IMIN among values of I1 to I10 at step 720. Subsequently, the control circuit 50 calculates a difference D between the maximum value IMAX and the minimum value IMIN as a change rate of the conductivity of the diluted brine at step 725 and causes the program routine to proceed to step 730 to determine whether the difference D is smaller than the predetermined reference value D0. If the answer at step 730 is "Yes" answer, the routine proceeds to step 735 where the control circuit 50 sets the flag "F" to "0" for start of the feedback control. As a result, the control circuit 50 obtains a "Yes" answer at step 315 in FIG. 3 and executes processing for the feedback control at step 245.

According to the third modification described above, when the difference D mentioned above becomes smaller than the reference value D0, the feedback control of the flow amount P discharged by the pump 60 is effected, since it is proper to infer that the measured current I will not exceed the reference value I(T)=I0 any more. Thus, even if the measured current I does not increase enough to effect the feedback control due to changes in pressure of the external source of raw water or in the concentration of saturated brine in tank 40, the feedback control of the flow amount P is effected as in the first and second modifications to avoid the fact that the electrolyzed water of desired property may not be produced due to lack of the feedback control.

In the third modification, it is preferable that an initial routine (not shown) is executed immediately after the start switch 72 is turned on to set the initial values of I1 to I10 appropriately so that the circuit 50 does not obtain a "Yes" answer at step 730 even if the current data of I1 to I10 not been obtained for a certain period immediately after start of the system starts to produce electrolyzed water.

In the first and second embodiments described above, it is also preferable that the memorized value RS is defined to be an average value or a weighted integral of the measured current I obtained in the routine currently executed as well as in the routine previously executed in order to stabilize the value RS. More particularly, when the stored value obtained in the presently executed routine is defined to be the value RSn, the value RSn can be calculated by an equation "$RSn = \alpha \cdot Pn + (1-\alpha) \cdot RSn-1$", where the Pn is the flow amount P discharged by the pump 60 in the presently executed routine, RSn−1 is the stored value which was obtained as Rn in the routine previously executed, and $\alpha$ is a predetermined value between "0" and "1".

Although in the embodiments described above, the memorized value RS is renewed immediately after the feedback control is started, the renewal of the memorized value RS may be delayed until a predetermined time period elapses after start of the feedback to obtain a more stable memorized value RS.

Hereinafter, a third embodiment in accordance with the present invention will be described in detail with reference to FIGS. 12 to 15. The third embodiment is substantially the same as the first and second embodiments described above except for a program routine to be executed by the electric control circuit 50.

A pump 60 used in the third embodiment is in the form of a pulse driven pump which discharges the saturated brine to mix with raw water by reciprocal movement of a diaphragm provided therein. In the pump, the diaphragm is moved by attractive forces generated by activation of a solenoid to discharge a constant amount of saturated brine per one cycle.

In the third embodiment, the pump 60 shown in FIG. 2 includes a pump housing 61 provided therein with a diaphragm 62 to form a pump chamber 63, a one way value 65 arranged to allow only a stream from an intake opening 64 to the pump chamber 63, and a one way valve 67 arranged to allow only a stream from the pump chamber 63 to a discharge opening 66. A plunger 68 is connected to the diaphragm 62 and is biased by a spring (not shown) loaded to the diaphragm toward the pump chamber 63. When the solenoid 69 is activated by a pulse applied from the control circuit 50, the plunger 68 is moved against the spring loaded diaphragm 62.

In operation of the pump 60 the plunger 68 reciprocates the diaphragm 62 in response to activation of the solenoid 69 to suck the saturated brine from the storage tank 40 and to discharge the brine into the brine supply pipe P6 for mixing with raw water. In this instance, the pump 60 discharges a constant amount of the saturated brine in response to the reciprocal movement of the diaphragm 62 at each time when the solenoid 69 is activated by the pulse signal applied thereto. Thus, the concentration of diluted brine is adjusted by variation of the discharge amount of the pump 60 per a unit time.

Hereinafter, operation of the third embodiment of the electrolyzed water production system will be described. The electric control circuit 50 starts at step 1300 to execute a routine shown in FIG. 13 and causes the routine to proceed to step 1305 to detect whether or not the state of the start switch 72 is changed from the "off" state to the "on" state. When the operator has not turned on the start switch 72, the circuit 50 obtains a "No" answer at step 1305 and causes the routine to proceed to step 1330 to detect whether the state of the start switch 72 is changed from the "on" state to the "off" state. At this point of time, the start switch 72 is maintained at the "off" state. Thus, the control circuit 50 obtains a "No" answer at step 1330, and finishes execution of the routine at 1396 step 1395.

When the operator turns on the start switch 72 to produce electrolyzed water, the control circuit 50 obtains a "Yes" answer at step 305 and causes the routine to proceed to step 1310. At step 1310, the control circuit 50 opens the water supply valve 27 supply the raw water into the electrolytic cell 20 and applies at step 1315 the constant voltage between the electrodes 24 and 25.

When the routine proceeds to step 1320 where the control circuit 50 sets a pump drive signal S for the pump 60, to an initial value R0, and caused the routine to proceed to step 1325. At step 1325, the circuit 50 sets a pulse interval ST, to "1" to apply a first pulse signal to the solenoid 69 and sets a value in the counter N, to "0". Thereafter, the control circuit 50 finishes execution of the routine at step 1395. With the operation described above, the production of the electrolyzed water is started.

Figure 13:
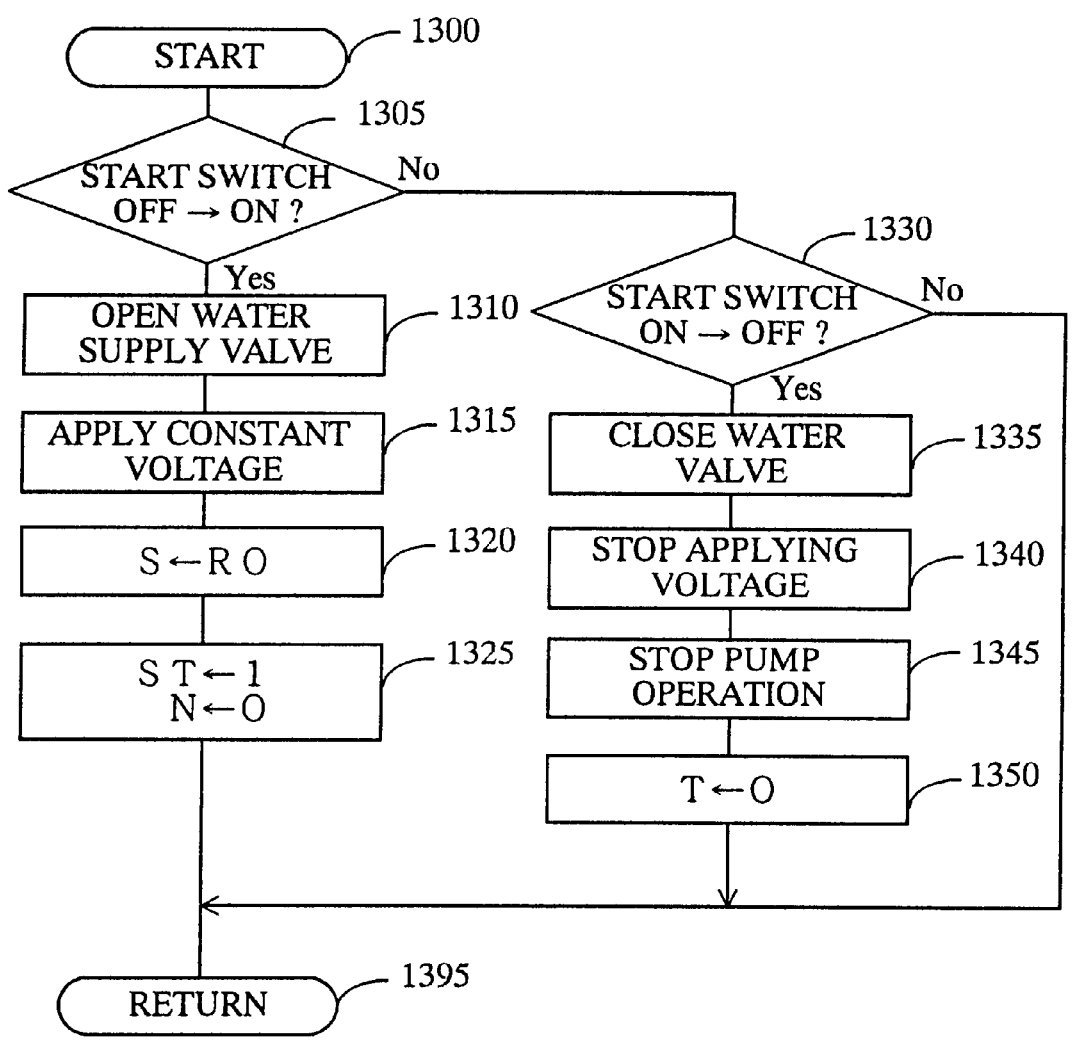
FIG. 13 is a flow chart of a control program (routine) executed by an electric circuit shown in FIG. 12 with respect to the third, the fourth and the fifth embodiment.
Figure 15:
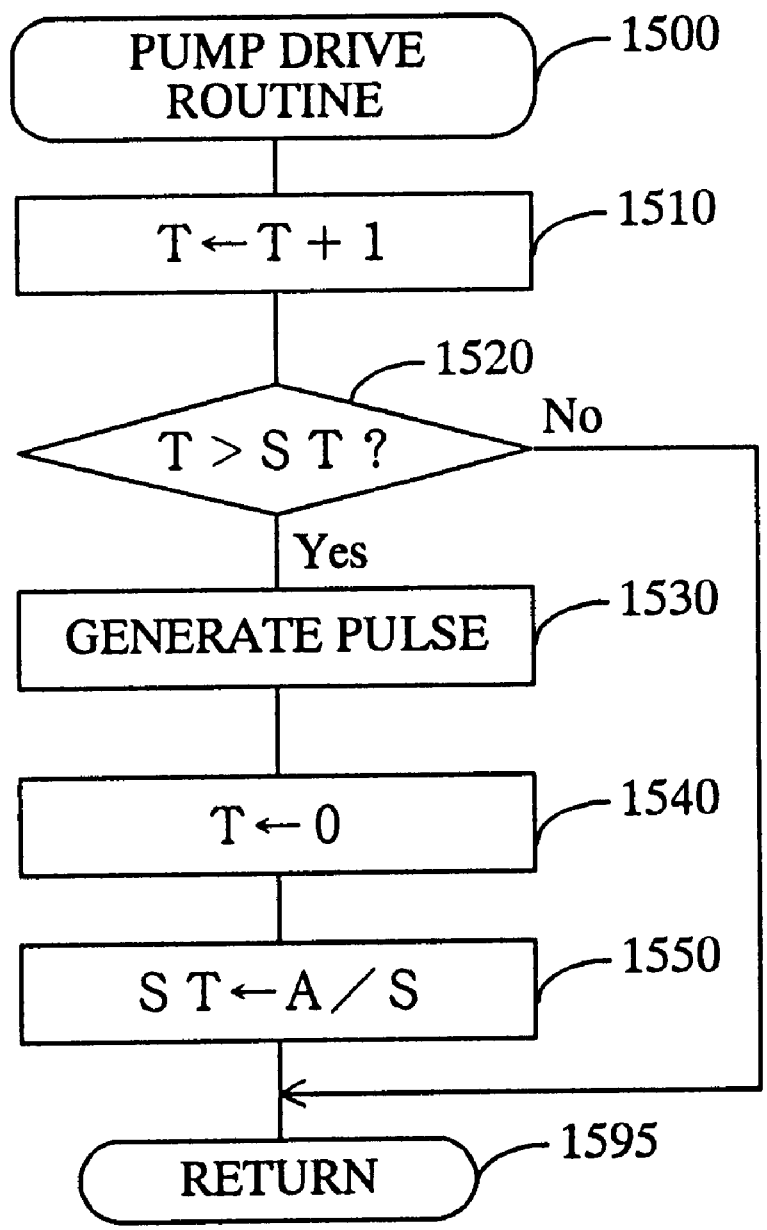
FIG. 15 is a flow chart of a control program (routine) executed by an electric circuit shown in FIG. 12 with respect to the third, the fourth and the fifth embodiment for a control of a fluid pump shown in FIG. 12.

A control method for driving the pump 60 will be described with reference to FIG. 15. A pump driving routine shown in FIG. 15 is executed by the control circuit 50 at a shorter interval than the interval at which the routine of FIG. 13 is executed. Assuming that the control circuit 50 has started execution of the pump driving routine at step 1500 shown in FIG. 15, the control circuit 50 increases the timer value T by "1" at step 1510 and causes the routine to proceed to step 1520 to compare the timer value T with the pulse interval ST. Since the timer value T is set to "0" at step 1540 immediately after the pulse signal has been generated or when the state of the start switch 72 has been changed from the "on" state to the "off" state (see step 1350 in FIG. 13), the circuit 50 obtains a "No" answer at step 1520 and finishes execution of the pump driving routine at step 1595.

Upon a lapse of a certain time period, the timer value T is increased by processing at step 1500, 1510, 1520 and 1595 and becomes larger than the pulse interval ST. When the timer value T in the timer N becomes larger than the pulse interval ST, the circuit 50 obtains a "Yes" answer at step 1520 and causes the routine to proceed to step 1530 to generate a pulse signal in the form of a high level signal for a predetermined time period (i.e. the pulse width is 10 msec.). Thus, the control circuit 50 applies the generated pulse signal to the solenoid 69 to effect discharge of the saturated brine from the discharge opening 66 of the pump 60. Subsequently, the circuit 50 sets the timer value T to "0" at step 1540 and sets at step 1550 the pulse interval ST used at step 1520 to a value which is inversely proportional to the drive signal S for the pump 60 (i.e. A/S; "A" is a constant positive number), and then proceeds to step 1595 to finish this routine tentatively.

It should be noted that the circuit 50 obtains a "Yes" answer at step 1520 when the circuit executes processing at step 1520 for the first time after the system starts to produce electrolyzed water because the pulse interval ST is set at "1" at step 1325 shown in the FIG. 13 and therefore proceeds to step 1530 to generate the pulse signal immediately. It is also noted that the pulse interval ST corresponds to the value R0 (e.g. ST=A/S=A/R0), because the drive signal S is set at the value R0 at step 1320 shown in FIG. 13, and the signal S remains the same (i.e. A/R0) until the drive signal S is altered.

According operation described above, the circuit 50 provides the solenoid 69 with a pulse signal having a high level (Hi) signal for the predetermined time period at a time interval in accordance with the pump drive signal S, i.e. inversely proportional to the pump drive signal S (A/S), and the diaphragm 62 moves in accordance with the pulse signal to mix the saturated water with the raw water. Therefore, as the drive signal S becomes larger, the pump 60 is driven at a higher speed and the discharge amount per a unit time of the saturated brine to be mixed by the pump 60 becomes larger.

A feedback control for the pump drive signal S (a control for the pulse interval ST of the pulse train by the feedback operation) will be described hereinafter. It should be noted that the circuit 50 executes the routine shown in FIG. 14 every one(1) second, while the circuit 50 repeats steps 1300, 1305, 1330 and 1395 shown in FIG. 13.

More concretely, the circuit 50 adds "1" to the value in the counter N at step 1405. The value in the counter N is used when the measured current I (corresponding to a detected conductivity of the diluted brine given to the electrolytic cell 20) is stored as I1 to I3, described later. The circuit 50 then proceeds to step 1410 to input the current across the electrodes 24 and 25 as the measured current I through the AD converter and proceeds to step 1415 to determine whether the value in the counter N is three(3).

Since the value in the counter N is set at "0" at step 1325 shown in FIG. 13 when the start switch 72 is turned on, the value becomes "1" at step 1405. Thus, the circuit 50 obtains a "No" answer at step 1415 and proceeds to step 1425 to determine whether the value in the counter N is one(1). The circuit 50 obtains a "Yes" answer at step 1425 and proceeds to step 1430 to store the measured current I obtained at the previous step 1410 as I1 in the memory of the microprocessor, and proceeds to step 1495 to finish this routine tentatively.

Figure 14:
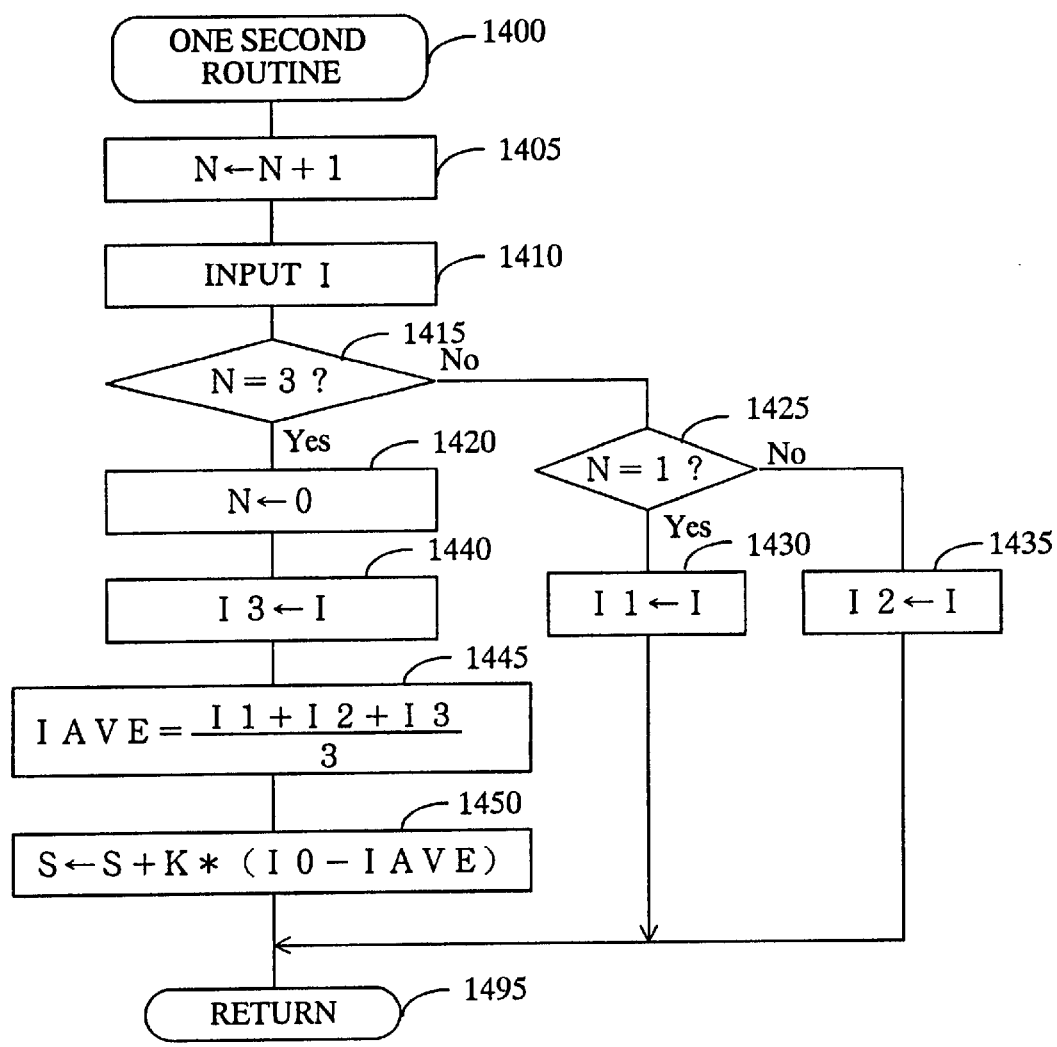
FIG. 14 is a flow chart of a control program (routine) executed by an electric circuit shown in FIG. 12 with respect to the third and the fifth embodiment.

At the lapse of one second from the timing above, the circuit 50 resumes to execute the routine shown in FIG. 14 and makes the value in the counter N two(2) at step 1405. Then the circuit 50 proceeds to step 1410 to input new (present) measured current I and proceed to steps of 1415 and 1425. At this time, the circuit 50 obtains a "No" answers at both steps of 1415 and 1425, it proceeds to step 1435 to store the measured current I obtained at step 1410 as I2 and finishes this routine.

At a lapse of another second, the circuit makes the value in the counter N three(3) at step 1405 and proceeds to step 1410 to input new (present) measured current I. The circuit 50, then, proceeds to step 1415 and obtains "Yes" answer this time, proceeds to 1420 to set the value in the counter N at zero(0).

The circuit 50 proceeds to 1440 after the execution of step 1420 to store measured current I obtained at step 1410 as I3, and proceeds to step 1445 to calculate an arithmetic mean (an average) of I1, I2 and I3 that have been stored, and then sets an average measured current IAVE as the calculated arithmetic mean indicative of average conductivity of the diluted brine. Then the circuit 50 proceeds to 1450. It should be noted that the data I1, I2 correspond to the plural data on conductivity previously detected (obtained) at the first predetermined interval, i.e. one second, and the I3 corresponds to the data on conductivity newly detected.

Step 1450 is for performing the feedback control for the flow amount P discharged by the pump 60 to obtain the diluted brine which has the optimal conductivity. Therefore, the circuit 50 sets the drive signal S at the value calculated by adding value proportional to the difference obtained by subtracting the average measured current IAVE from the target value I0 (K·(I0−IAVE), "K" is a positive constant number) to the instant drive signal S indicative of the present flow amount P, and proceeds to step 1495 to finish this routine tentatively.

Accordingly, the circuit 50 increases the drive signal S if the average measured current IAVE is smaller than the target current value I0 to increase the flow amount P to be discharged by the pump 60 by shortening the pulse interval of the pulse train ST, whereas the circuit 50 decreases the drive signal S if the average measured current IAVE is larger than the target current value I0 to decrease the flow amount P to be discharged by the pump 60 by lengthening the pulse interval of the pulse train ST. By the operation described above, the feedback control is performed. As is understood from above description, the measured current is newly detected again repetitively every one (1) second, and the average measured current IAVE as well as the pump drive signal S is renewed when the value in the counter N becomes three, i.e. every three(3) seconds.

Since the circuit 50 continuously executes the routine shown in FIG. 13 at the predetermined interval, when the operator turns off the start switch 72 to stop producing electrolyzed water, the circuit 50 obtains a "No" answer at step 1305 and proceeds to step 1330 to determine whether the state of the start switch 72 was changed from the "on" state to the "off" state. Under this condition, the circuit 50 obtains a "Yes" answer at step 1330 and proceeds to steps 1335 to 1345 to execute the necessary steps to stop producing electrolyzed water. More concretely, the circuit 50 closes the water supply valve 27 to stop supplying raw water at step 1335, stops applying voltage between the electrodes 24 and 25, and stops operation of the pump 60 (i.e. stop generating pulse train) at step 1345. Subsequently, the circuit 50 proceeds to step 1350 to set the value in the timer T at "0" used in the pump driving routine described above and proceeds to step 1395 to finish this routine tentatively.

As described above, the third embodiment on the electrolyzed water production system in accordance with the present invention obtains the average measured current IAVE of the three (plural) data consisting of the measured current I indicative of the present conductivity, i.e. I3, and the measured current I detected in the routine executed previously as well as in the routine executed before the previous execution of the routine, i.e. I2 and I3. The system also calculates the pump drive signal S for the pump 60 in such a manner that the average measured current IAVE becomes equal to the target value I0, and generates the pulse train having the pulse interval ST which corresponds to the pump drive signal S.

Accordingly, even if the circuit 50 detects the measured current I which is larger than the average value of the measured current I for a certain period of time because the timing when the circuit 50 obtains the measured current I happens to fall on the timing when a certain portion of the diluted brine having high density because of the saturated brine discharged by the pump 60 reaches the electrolytic cell 20, the circuit 50 uses, instead of the measured current I just detected, the average measured current IAVE obtained based on not only the measured current I just detected but the measured current I detected at the successively previous timings for the feedback control. Thus, the system can decrease the fluctuation of the density of the diluted brine stemming from the detection timing of the measured current I and can produce desired electrolyzed water having a stable property.

Hereinafter, a fourth embodiment in accordance with the present invention will be described. The system of the fourth embodiment is different from the system of the third embodiment in that the fourth embodiment substitutes routine shown in FIG. 16 for the routine shown in FIG. 14. In operation, the fourth embodiment is different from the third embodiment in that the third embodiment uses the measured current I(I1) detected immediately after the calculation and the renewal of the pump drive signal S is performed for the successive calculation and the renewal of the average measured current IAVE and the pump drive signal S, whereas the fourth embodiment uses the measured current I(I2) detected after the detection of the measured current I(I1) and the measured current I detected successively at a lapse of the predetermined interval after the detection of the measured current I(I2).

Figure 16:
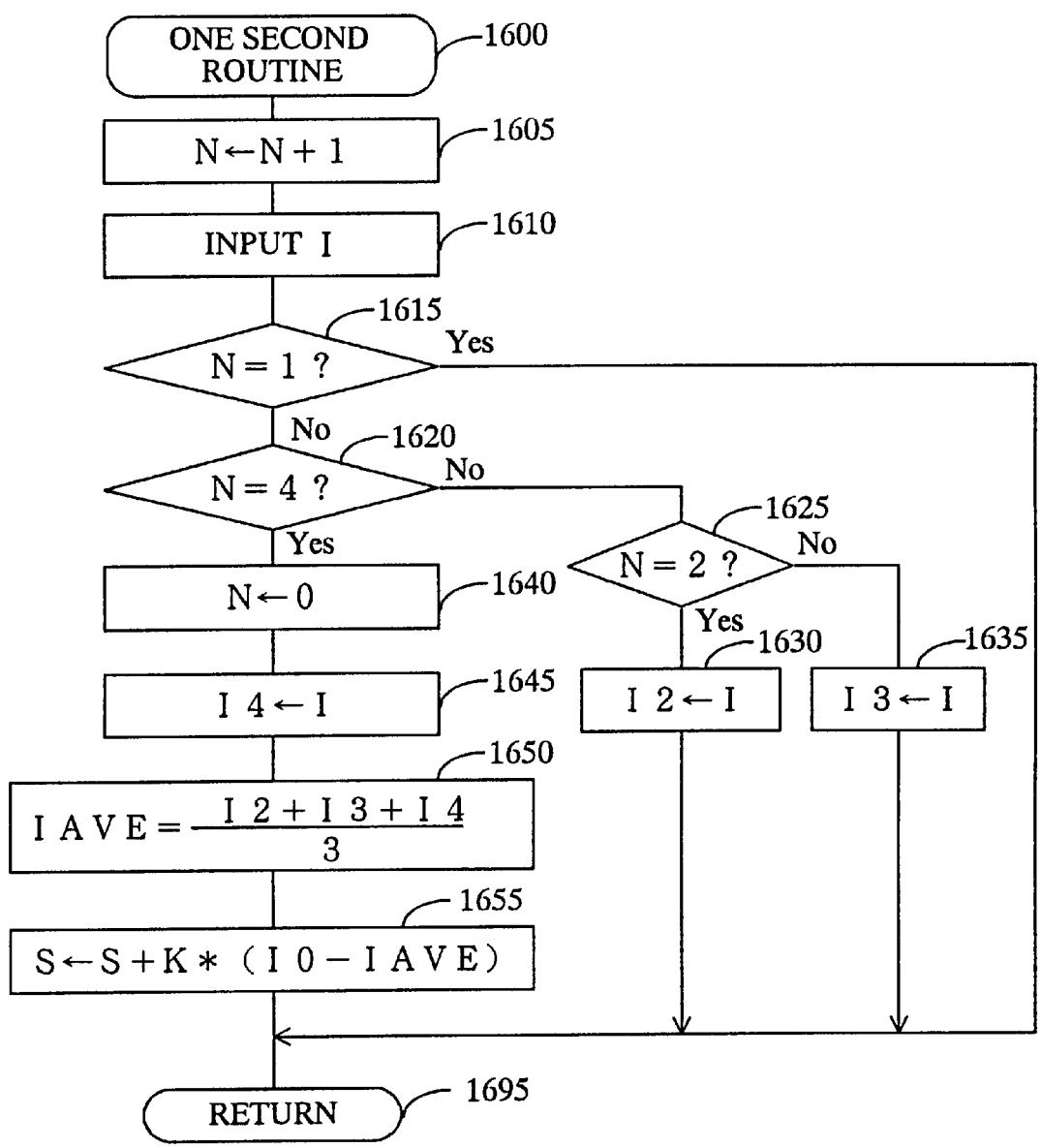
FIG. 16 is a flow chart of a control program (routine) executed by an electric circuit shown in FIG. 12 with respect to the fourth embodiment.

More concretely, the circuit 50 executes routine shown in FIG. 16 at a lapse of one (1) second (i.e. every 1 second), as in FIG. 14, and proceeds to steps 1605 and 1610 which is identical to steps 1405 and 1410 shown in the FIG. 14 respectively to increase the value in the counter N by "1" and to detect the measured current I at that present.

The value in the counter N becomes "1" by the execution of step 1605 when the step 1605 is executed immediately after the start switch 72 was turned on since the value in the counter N was set at "0" by the execution of the step 1325. Accordingly, the circuit 50 obtains a "Yes" answer at step 1615 at which the circuit 50 determines whether the value in the counter N is "1" and proceeds to step 1695 to finish this routine tentatively without storing the measured current I.

At a lapse of one second, the circuit 50 executes the routine shown in FIG. 16 and proceeds to step 1605 to set the value in the counter N at "2". It then proceeds to step 1610 to detect the measured current I again. The circuit 50, then, proceeds to step 1615, obtains a "No" answer this time and proceeds to step 1620 to determine whether the value in the counter N is "4". The circuit 50 obtains a "No" answer and proceeds to step 1625 to determine whether the value in the counter is "2". Since the value is "2" at this time, the circuit 50 proceeds to step 1630 to store the measured current I as I2 and proceeds to step 1695 to finish this routine tentatively.

Further, at a lapse of another one second, the circuit 50 starts the routine shown in FIG. 16 from step 1600 and proceeds to step 1605 to increase the value in the counter N by "1". Thus the value in the counter N becomes "3".

Then the circuit 50 again detects the measured current I at step 1610, and obtains a "No" answers at the all steps of 1615, 1620 and 1625. Then, it proceeds to step 1635 to store the measured current I as I3 and proceeds to step 1695 to finish this routine tentatively.

The circuit 50 increases the value in the counter N which then becomes "4" at step 1605 in the routine resumed another one second later, detects the measured current I at step 1610, obtains a "No" answer at step 1615, obtains "Yes" answer at step 1620 and proceeds to step 1640 to set the value in the counter N at "0". Then the circuit 50 stores the measured current I as I4 and proceeds to step 1650 to calculate an arithmetic mean of I2, I3 and I4 and to store the mean as the average measured current IAVE. Subsequently, the circuit 50 proceeds to step 1655 to calculate and renew the pump drive signal S, as steps 1450 shown in FIG. 14. From this time, the circuit 50 repeats operation described above to renew the pump drive signal S (i.e. carrying out the feedback control).

According to the fourth embodiment described above, the circuit 50 detects the measured current I at a first predetermined interval (i.e. one second), calculates a average measured current IAVE at a second predetermined interval (i.e. four seconds), and renews the pump drive signal S. However, the circuit 50 does not store the measured current I which is detected immediately after the drive signal S is renewed (i.e. when the value in the counter N becomes "1" at step 1605). Therefore, the circuit 50 does not use the measured current I which is detected immediately after the drive signal S was renewed for the calculation of the average measured current IAVE at step 1650. Thus, the circuit 50 is designed not to use the measured current I which is very unlikely to be effected by the result of the renewal of the pump drive signal S according to the average measured current IAVE. Instead, the circuit 50 adopts the measured current I obtained at or after a lapse of the third predetermined time interval (i.e. 2 seconds) for the calculation of the next average measured current IAVE ( i.e. the next drive signal S). As a result, the feedback control operation for the pump 60 becomes stable.

It should be noted that there is a small delay from the time that the pump drive signal S is renewed till the result of the renewal of the drive signal S appears as the actual flow amount discharged by the pump 60. That is, the time period between the timing of the renewal of the drive signal S and the timing of pulse generation to solenoid 69 of the pump 60 varies. Thus, the time period between the timing that the actual flow amount discharged by the pump 60 is effected by the renewed pump drive signal S and the timing that the measured current I is stored as I2 varies.

This time delay is very short and can be ignored, however, it may be preferable to eliminate the effect caused by the delay. From this point of view, the following measures may be taken. That is, the program is designed in such a manner that the circuit 50 proceeds to the step 1600 shown in FIG. 16 when the pump discharges the saturated brine based on the signal effected by the renewed pump drive signal S (i.e. at the timing of the generation of the pulse effected by the renewed pump drive signal S to the solenoid 69). Alternatively, the program is designed to have an additional timer which measures the time period from the timing when the pump 60 discharges the saturated brine based on the signal influenced by the renewed pump drive signal S, and to store the measured current I detected when the additional timer measures a predetermined constant time period as I2. The constant time is preferably defined to be equal to the time period in which the saturated brine takes to reach the electrolytic cell 20 from the pump 60.

As is understood from the above description, the measured current I detected when the value in the counter N becomes equal to a certain number, which is "1" in this embodiment described above, is not used for the calculation of the average measured current IAVE, but the certain number can be any number. That is, a determination on how many data on the measured current I, out of the measured current I successively detected during the time period from the renewal of the pump drive signal S according to the renewed average measured current IAVE to the next renewal of the pump drive signal S should not be used for the calculation for the next average measured current IAVE should be made based on the sampling timing of the measured current I or on the time period which is necessary for the brine from the pump 60 to reach the electrolytic cell 20.

Hereinafter, a fifth embodiment will be described. The electrolyzed water production system according to the fifth embodiment is different from the system of the third embodiment only in that the system of the fifth embodiment substitutes routine shown in FIG. 17 for the step 1445 in the routine shown in FIG. 14.

That is, the circuit 50 of the fifth embodiment stores measured current I as I1 to I3 every one second successively and proceeds to step 1710 from step 1440. At step 1710, the circuit 50 selects one out of I1, I2 and I3 which has the largest absolute deviation from the target value I0 and stores it as J1, selects one out of I1 to I3 which has the smallest absolute deviation from the target value I0 and store it as J3, and stores the rest as J2.

The circuit 50 determines whether a predetermined condition is satisfied after the start switch 72 was turned on at step 1720. The predetermined condition above can be the condition which indicates that it is time to give priority to stability of the control instead of response time of the system. For instance, it could be "when a predetermined time period has passed since the start switch 72 was turned on", or could be "when the measured current I, for the first time, becomes larger than the reference value which may be the target value I0 or may be the value being smaller than the target value by a certain amount".

The circuit 50 obtains a "No" answer at step 1720 since the predetermined condition is not satisfied immediately after the system has started producing the electrolyzed water and proceeds to step 1730 to calculate a weighted integral IAVE (weighted average) for improving the response time of the feedback control. More concretely, the circuit 50 calculates the weighted integral by multiplying J1, J2 and J3 by "m1/(m1+m2+m3)" where "m1" is the largest coefficient among m1, m2 and m3 and "m1+m2+m3=1", by "m2/(m1+m2+m3)" where "m2" is smaller than "m1" but larger than "m3", and by "m3(m1+m2+m3)" where "m3" is the smaller than "m2" respectively, then store the weighted integral as the average measured current IAVE, and then proceeds to step 1450.

The circuit 50 calculates the pump drive signal S at step 1450 shown in FIG. 14. That is, it renews the pump drive signal S by adding a value which is proportional to value obtained by subtracting the average measured current IAVE from the target value I0 to the present pump drive signal S at step 1450. The circuit 50, just like the fourth embodiment, executes the routine shown in FIG. 15, and generates pulse signal sent to the solenoid 69 at a time interval in accordance with the pump drive signal S.

When the predetermined condition described above is satisfied, the circuit 50 obtains a "Yes" answer at step 1720 and proceeds to step 1740 to calculates the weighted integral IAVE for improving the response time of the feedback control. That is, the circuit 50 calculates the weighted integral IAVE by multiplying J1, J2, and J3 by "k1/(k1+k2+k3)" where "k1" is the smallest coefficient among k1, k2 and k3 and "(k1+k2+k3)=1", by "k2" which is larger than "k1" but smaller than "k3" and by "k3" which is the larger than "k2" respectively. The circuit 50 sets the average measured current IAVE at the weighted integral just calculated. It then proceeds to step 1450 shown in FIG. 14 to obtain the pump drive signal S, as described above, and generates the pulse train of which period is in accordance with the pump drive signal S by executing the routine shown in FIG. 15.

With the operation described above, the system according to the fifth embodiment, the average measured current IAVE is set at the value for improving (shortening) the response time during the measured current I (the conductivity of the diluted brine) is small compared to the target value I0 and therefore the difference D between the average measured current IAVE and the target value I0 becomes large. As a result, the time required to produce the electrolyzed water having the desired property after the system is activated to start the electrolyzed water becomes short, because the system increases the pump drive signal S more rapidly.

On the other hand, when the flow amount of the saturated brine becomes substantially equal to the optimal value (i.e. when the property of the electrolyzed water produced becomes stable), the system obtains the weighted integral of the measured current I to make the difference D smaller. As a result, the system can continuously produce the electrolyzed water having the desired property with stability, because the feedback control becomes stable (i.e. the flow amount of the saturated brine P does not change easily).

It should be noted that the various modified embodiments can be adopted with respect to the third, the fourth and the fifth embodiments described above. For instance, although the pulse signal used in these embodiments is the signal having the square-wave, it can be any signal that causes the pump to discharge intermittently, such as sign-wave signal and chop-wave signal.

It should be also noted that the pulse interval ST is set at the value inversely proportional to the pump drive signal S, however, any conversion from the pump drive signal S to the pulse interval ST can be adopted as long as the conversion changes the signal S into the interval ST in such a manner that the interval ST becomes smaller as the signal S becomes larger.

As is understood from above description on the embodiments in accordance with the present invention, the feedback control for the flow amount P discharged by the pump 60 can be defined as the feedback control for the amount of the saturated brine (i.e. the additive to help electrolyze the water) mixed with the raw water or the feedback control for the density of the diluted water supplied to the cell 20 because the flow amount of the raw water in the diluted water supplied to the cell 20 is substantially constant.

What is claimed is:

1. An electrolyzed water production system having a brine storage tank arranged to store saturated brine of a predetermined concentration, a brine supply means for supplying the saturated brine from said storage tank for mixing with raw water supplied from a source of raw water and an electrolytic cell arranged to be supplied with diluted brine prepared by a mixture of the raw water and saturated water for producing electrolyzed water, wherein an electric control apparatus for the electrolyzed water production system comprises:

detection means for detecting the conductivity of the diluted brine supplied to said electrolytic cell;

feedback control means for controlling the operation of said brine supply means in such a manner that the conductivity of the diluted brine detected by said detection means is adjusted to a predetermined target value;

memory means for memorizing an amount of saturated brine mixed with the raw water during operation of said brine supply means under control of said feedback control means and initial control means for controlling the operation of said brine supply means in such a manner that a supply amount of saturated brine mixed with the raw water is adjusted on a basis of the instant amount of saturated brine memorized in said memory means during a previous operation of said brine supply means under control of said feedback control means when said electrolytic cell is activated to start production of the electrolyzed water.

2. An electrolyzed water production system as recited in claim 1, wherein said initial control means is designed to control the operation of said brine supply means in such a manner that the supply amount of saturated brine mixed with the raw water is decreased in a predetermined amount less than that of the saturated brine memorized in said memory means.

3. An electrolyzed water production system as recited in claim 1, wherein said initial control supply means is designed to delay operation of said brine supply means under control of said feedback control means until the conductivity of the diluted brine detected by said detection means becomes larger than a predetermined reference value.

4. An electrolyzed water production system as recited in claim 3, wherein the reference value is defined by the target value of said feedback control means.

5. An electrolyzed water production system as recited in claim 3, wherein the reference value is defined to be decreased in accordance with a lapse of time after said electrolytic cell is activated to start production of the electrolyzed water.

6. An electrolyzed water production system as recited in claim 1, wherein said initial control means is designed to operate said brine supply means under control of said feedback control means after a lapse of a predetermined time when said electrolytic cell was activated to start production of the electrolyzed water.

7. An electrolyzed water production system as recited in claim 1, wherein said initial control means is designed to operate said brine supply means under control of said feedback control means after a change rate of the conductivity of the diluted brine detected by said detection means is decreased less than a predetermined reference value.

8. An electrolyzed water production system as recited in claim 1, wherein said brine supply means is in the form of a fluid pump of the type driven by each pulse of pulse train signals applied thereto, and wherein said detection means comprises means for detecting the conductivity of the diluted brine at a first predetermined time interval and calculation means for calculating an average value of the conductivity detected at the first predetermined time interval.

9. An electrolyzed water production system having a brine storage tank arranged to store saturated brine of predetermined concentration, a fluid pump of the type driven by each pulse of pulse train signals applied thereto from a pulse signal generator to supply a predetermined amount of saturated brine from said brine storage tank for mixing with raw water supplied from a source of raw water, and an electrolytic cell arranged to be supplied with the diluted brine prepared by a mixture of the saturated brine and raw water for producing electrolyzed water, wherein an electric control apparatus for the production system comprises:

detection means for detecting the conductivity of diluted brine supplied to said electrolytic cell at a first predetermined time interval;

calculation means for calculating an average value of the conductivity successively detected by said detection means in sequence; and pulse control means for adjusting a period of the pulse train signals applied from said pulse signal generator in accordance with a difference between the calculated average value of the conductivity and a predetermined target value so that the average conductivity becomes substantially equal to the target value.

10. An electrolyzed water production system as recited in claim 9, wherein said pulse control means is designed to adjust the period of the pulse train signals at a second predetermined time interval more than the first predetermined time interval, and wherein said calculation means is designed to calculate the average value of the conductivity on a basis of plural data on conductivity detected by the detection means plural times at the first predetermined time interval during said second predetermined time interval except several data on conductivity detected successively by the detection means immediately after said pulse control means adjusts said period of the pulse train signals.

11. An electrolyzed water production system as recited in claim 9, wherein said calculation means is designed to weight the conductivity with a value which becomes larger as a difference between the conductivity detected by said detection means and the target value becomes larger for calculating a weighted integral of the conductivity.

12. An electrolyzed water production system as recited in claim 9, wherein said calculation means is designed to weight the conductivity with a value which becomes smaller as a difference between the conductivity detected by said detection means and the target value becomes larger for calculating a weighted integral of the conductivity.

13. An electrolyzed water production system as recited in claim 9, wherein said calculation means is designed to weight the conductivity with a value which becomes larger as a difference between the conductivity detected by said detection means and the target value becomes larger until a predetermined condition is satisfied after said electrolytic cell is activated to start production of electrolyzed water and to weight the conductivity with a value which becomes smaller as a difference between the conductivity detected b said detection means and the target value becomes larger after the predetermined condition is satisfied.

* * * * *